United States Patent
Kobayashi

(10) Patent No.: US 10,469,747 B2
(45) Date of Patent: Nov. 5, 2019

(54) INFRARED IMAGING DEVICE AND SIGNAL CORRECTION METHOD USING INFRARED IMAGING DEVICE

(71) Applicant: FUJIFILM Corporation, Tokyo (JP)

(72) Inventor: Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 15 days.

(21) Appl. No.: 15/951,388

(22) Filed: Apr. 12, 2018

(65) Prior Publication Data

US 2018/0234628 A1 Aug. 16, 2018

Related U.S. Application Data

(63) Continuation of application No. PCT/JP2016/080805, filed on Oct. 18, 2016.

(30) Foreign Application Priority Data

Oct. 29, 2015 (JP) .................................. 2015-213031

(51) Int. Cl.
*H04N 5/232* (2006.01)
*H04N 5/33* (2006.01)
(Continued)

(52) U.S. Cl.
CPC ............ *H04N 5/23245* (2013.01); *G01J 1/42* (2013.01); *G01J 1/44* (2013.01); *G06T 1/00* (2013.01);
(Continued)

(58) Field of Classification Search
CPC ............ H04N 5/23245; H04N 5/3656; H04N 5/3658; H04N 5/2176; H04N 5/33;
(Continued)

(56) References Cited

U.S. PATENT DOCUMENTS

| 5,181,118 A * | 1/1993 | Kimura .................. H04N 1/401 348/243 |
| 6,230,108 B1 * | 5/2001 | Matsuda .................. G01J 5/524 250/208.1 |

(Continued)

FOREIGN PATENT DOCUMENTS

| JP | 2001-518760 A | 10/2001 |
| JP | 2003-298949 A | 4/2005 |

(Continued)

OTHER PUBLICATIONS

International Preliminary Report on Patentability and Written Opinion of the International Searching Authority(Forms PCT/IB/326, PCT/IB/373 and PCT/ISA/237), dated May 11, 2018, for International Application No. PCT/JP2016/080805, with English Translation of the Written Opinion.

(Continued)

*Primary Examiner* — Luong T Nguyen
(74) *Attorney, Agent, or Firm* — Birch, Stewart, Kolasch & Birch, LLP

(57) ABSTRACT

The infrared imaging device includes an optical system, an infrared detector that captures an infrared image, a correction unit that corrects an infrared image based on basic correction data and outputs a corrected image, and an offset value calculation unit. The offset value calculation unit detects a subject region from the corrected image, calculates a subject value indicating a pixel value of a subject region, and calculates a subject value change amount which is a change amount of a pixel value of the subject region based on the reference subject value and the calculated subject value, and calculates the subject value change amount, as a representative offset value indicating a change amount of each pixel value of a plurality of pixels caused by a temperature change.

20 Claims, 11 Drawing Sheets

(51) Int. Cl.
*G01J 1/42* (2006.01)
*G06T 1/00* (2006.01)
*H04N 5/217* (2011.01)
*H04N 5/365* (2011.01)
*G01J 1/44* (2006.01)

(52) U.S. Cl.
CPC ............. *H04N 5/2176* (2013.01); *H04N 5/33* (2013.01); *H04N 5/3656* (2013.01); *H04N 5/3658* (2013.01); *G01J 2001/444* (2013.01)

(58) Field of Classification Search
CPC .......... G01J 1/42; G01J 1/44; G01J 2001/444; G06T 1/00
See application file for complete search history.

(56) References Cited

U.S. PATENT DOCUMENTS 6,396,045 B1  5/2002  Ballingall et al.
2013/0022279 A1*  1/2013  Hogasten ................. H04N 5/33
                                                                382/218
2013/0093902 A1*  4/2013  Honda ..................... H04N 5/33
                                                                348/164
2015/0319387 A1*  11/2015  Saragaglia ........... H04N 5/3651
                                                                348/164

FOREIGN PATENT DOCUMENTS

JP    2005-96752 A    4/2005
JP    4910529 B2      4/2012

OTHER PUBLICATIONS

International Search Report (Form PCT/ISA/210), dated Dec. 13, 2016, for International Application No. PCT/JP2016/080805, with English Translation.

* cited by examiner

FIG. 3
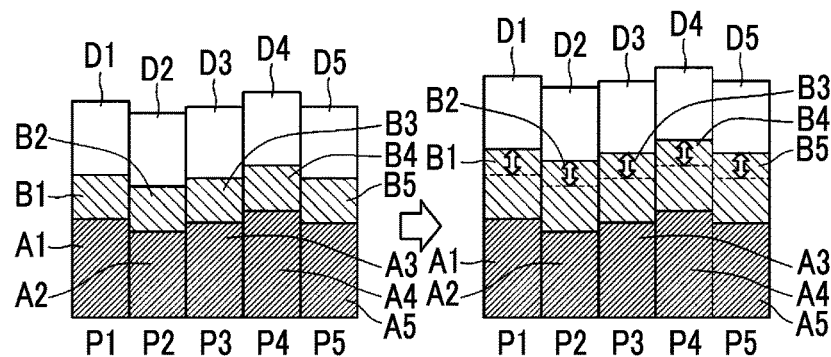
FIG. 4
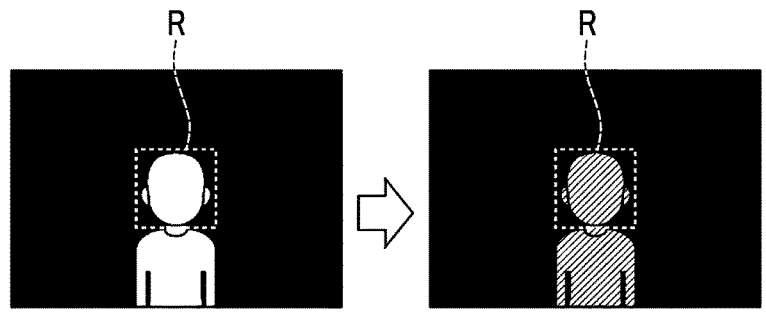
FIG. 5
| P1 | P2 | P3 | P4 | P5 |
| --- | --- | --- | --- | --- |
| P6 | P7 | P8 | P9 | P10 |
| P11 | P12 | P13 | P14 | P15 |
| P16 | P17 | P18 | P19 | P20 |
| P21 | P22 | P23 | P24 | P25 |

| 1000 | 1010 | 1020 | 1030 | 1040 |
|------|------|------|------|------|
| 1030 | 1020 | 1010 | 1020 | 1030 |
| 1030 | 1020 | 1030 | 1020 | 1000 |
| 1020 | 1030 | 1010 | 1010 | 1010 |
| 1010 | 1030 | 1020 | 1030 | 1020 |

| 990 | 1000 | 1010 | 1020 | 1030 |
|------|------|------|------|------|
| 1020 | 1010 | 1000 | 1010 | 1020 |
| 1020 | 1010 | 1020 | 1010 | 990 |
| 1010 | 1020 | 1000 | 1000 | 1000 |
| 1000 | 1020 | 1010 | 1020 | 1010 |

FIG. 13

| | | | | |
|---|---|---|---|---|
| 0.5 | −0.1 | 0.4 | −0.3 | 0.2 |
| 0.3 | 0.1 | 0.4 | −0.5 | −0.1 |
| 0.2 | 0.3 | 0.2 | 0.4 | 0.5 |
| −0.1 | 0.2 | 0.3 | 0.1 | 0.4 |
| 0.1 | −0.2 | 0.1 | 0.2 | 0.3 |

FIG. 14A

| | | | | |
|---|---|---|---|---|
| 1000 | 1000 | 1000 | 1000 | 1000 |
| 1000 | 1000 | 1000 | 1000 | 1000 |
| 1000 | 1000 | 1000 | 1000 | 1000 |
| 1000 | 1000 | 1000 | 1000 | 1000 |
| 1000 | 1000 | 1000 | 1000 | 1000 |

FIG. 14B

| | | | | |
|---|---|---|---|---|
| 985 | 991 | 986 | 993 | 988 |
| 987 | 989 | 986 | 995 | 991 |
| 988 | 987 | 988 | 986 | 985 |
| 991 | 988 | 987 | 989 | 986 |
| 989 | 992 | 989 | 988 | 987 |

INFRARED IMAGING DEVICE AND SIGNAL CORRECTION METHOD USING INFRARED IMAGING DEVICE

CROSS-REFERENCE TO RELATED APPLICATIONS

This application is a Continuation of PCT International Application No. PCT/JP2016/080805 filed on Oct. 18, 2016, which claims priority under 35 U.S.C. § 119(a) to Japanese Patent Application No. 2015-213031 filed on Oct. 29, 2015. Each of the above application(s) is hereby expressly incorporated by reference, in its entirety, into the present application.

BACKGROUND OF THE INVENTION

1. Field of the Invention

The present invention relates to an infrared imaging device that captures an infrared image and a signal correction method using the infrared imaging device, and particularly, to an infrared imaging device that corrects a pixel signal of an infrared image and a signal correction method using the infrared imaging device.

2. Description of the Related Art

An infrared imaging device that detects incident infrared light (infrared rays) and generates an infrared image has been known. In general, the infrared imaging device includes an infrared detector that detects infrared rays radiated from a subject and converts the detected infrared rays into electric signals. The infrared imaging device is used in various fields of a monitoring camera, a night vision device, thermography, or forward monitoring device mounted on a vehicle or an aircraft.

In an infrared imaging device, unevenness for each pixel such as a variation in pixel-intrinsic sensitiveness of a detector element (pixel) of an infrared detector is present. In a case where the unevenness for each pixel is present, even though a surface having a uniform temperature is captured by the infrared imaging device, a variation occurs in an image signal (pixel value), and a uniform image is not acquired. In order to reduce the influence of the unevenness for each pixel, correction data constituted by correction values corresponding to unevenness of the pixels may be acquired, and unevenness correction processing for performing correction for offsetting the correction value corresponding to the pixel from the pixel value detected in the pixel may be performed. For example, the correction data used in the unevenness correction processing is acquired in a state in which a light source having a uniform light amount is provided on a front surface of the infrared detector and infrared rays incident on the infrared detector are blocked from an outside.

For example, JP2005-96752A discloses a method of acquiring the correction data used in the unevenness correction processing by providing a shutter mechanism within the infrared imaging device and blocking the infrared rays incident on the infrared detector from the outside by the shutter.

The unevenness for each pixel changes with temperature changes of a main body of the infrared imaging device, a circuit board, and a pixel itself. Thus, it is preferable that the correction data used in the unevenness correction processing is repeatedly acquired. In a case where the unevenness correction processing is performed on the infrared images at multiple points of time by using common correction data irrespective of the temperature change, there is a possibility that an inappropriate correction result having a defect such as overexposing indicating that a bright portion of the image is displayed in white or underexposing indicating that a dark portion of the image is displayed in black will occur for the infrared image at another point of time even though an appropriate correction result is acquired for the infrared image at a certain point of time is acquired.

JP4910529B suggests a method of calculating an average value of pixel values of persons of two infrared images based on two infrared images acquired by capturing the same person in two imaging devices and correcting the pixel values of the two infrared images such that the pixel values of the persons of the two infrared images match the average value.

SUMMARY OF THE INVENTION

Here, in the technology described in JP2005-96752A, since it is necessary to set a shutter in a closed state in order to acquire the correction data used in the unevenness correction processing, time when an external environment is not able to be captured may arise. However, for example, it is not preferable that the capturing of the external environment is interrupted in a specific situation such as a period during which a subject to be noticed is captured.

JP4910529B is merely the technology that calculates the correction value for matching the pixel values of the corresponding subjects between the two infrared images captured in different imaging devices. Thus, in the technology of JP4910529B, in a case where the temperature change of the external environment occurs, it is necessary to update the correction data used in the unevenness correction processing of the two imaging devices, and time when the capturing in the imaging devices is not able to be performed may arise.

Thus, even though the unevenness for each pixel changes due to the temperature change, a method capable of acquiring the correction data used in the unevenness correction processing is needed without interrupting the capturing of the external environment.

The present invention has been made in view of the circumstances, and an object of the present invention is to suggest an infrared imaging device capable of correcting the change in unevenness for each pixel caused by a temperature change without interrupting the capturing of an external environment, and a signal correction method using the infrared imaging device.

An infrared imaging device according to the present invention comprises an optical system, an infrared detector that is positioned on an image forming surface of the optical system, includes a plurality of pixels which detect incident infrared rays, and captures an infrared image by using the plurality of pixels, a correction unit that corrects the infrared image based on basic correction data for correcting unevenness for each pixel of the plurality of pixels, and outputs a corrected image, and an offset value calculation unit. The offset value calculation unit has a region detection unit that detects a subject region corresponding to a target subject from the corrected image, a pixel value calculation unit that calculates a subject value indicating a pixel value of the subject region, a change amount calculation unit that calculates a subject value change amount which is a change amount of the pixel value of the subject region based on the subject value and a reference subject value which is the pixel value of the subject region on a corrected reference image acquired by correcting a reference infrared image which is an infrared image as a reference captured by the infrared detector based on the basic correction data, and a representative offset value calculation unit that calculates the subject value change amount, as a representative offset value indicating a change amount of each pixel value of the plurality of pixels caused by a temperature change. The correction unit corrects the infrared image based on the representative offset value and the basic correction data.

A signal correction method using an infrared imaging device according to the present invention is a signal correction method using an infrared imaging device including an infrared detector which is positioned on an image forming surface of an optical system and includes a plurality of pixels which detects incident infrared rays. The method comprises a capturing step of capturing an infrared image by using the plurality of pixels, a correction step of correcting the infrared image and outputting a corrected image based on basic correction data for correcting unevenness for each pixel of the plurality of pixels, and an offset value calculation step. The offset value calculation step has a region detection step of detecting a subject region corresponding to a target subject from the corrected image, a pixel value calculation step of calculating a subject value indicating a pixel value of the subject region, a change amount calculation step of calculating a subject value change amount which is a change amount of the pixel value of the subject region based on the subject value and a reference subject value which is the pixel value of the subject region on a corrected reference image acquired by correcting a reference infrared image which is an infrared image which is a reference captured by the infrared detector based on the basic correction data, and a representative offset value calculation step of calculating the subject value change amount, as a representative offset value indicating a change amount of each pixel value of the plurality of pixels caused by a temperature change. In the correction step, the infrared image is corrected based on the representative offset value and the basic correction data.

The "change amount of each pixel value of the plurality of pixels caused by a temperature change" means a change amount caused by a temperature change, which is a change amount of the pixel values of the plurality of pixels included in the infrared detector. As an example of the change amount, there are change amounts of the pixel values caused by temperature changes of an infrared imaging device main body, a circuit board, and a pixel itself caused by a temperature change of an external environment, and temperature changes of the circuit board and the pixel itself caused by the electric conduction of the circuit board.

In the infrared imaging device according to the present invention, it is preferable that the correction unit performs offset correction on the infrared image by using data acquired by increasing or decreasing the basic correction data by the representative offset value.

In the infrared imaging device according to the present invention, the offset value calculation unit may further include an intrinsic offset value calculation unit that calculates an intrinsic offset value corresponding to the representative offset value for each pixel of the plurality of pixels based on intrinsic value information indicating a relationship between the representative offset value and the intrinsic offset value indicating the change amount of the pixel value of the pixel caused by the temperature change for each pixel of the plurality of pixels, and the correction unit may perform offset correction on the infrared image by using data acquired by increasing or decreasing the basic correction data by the intrinsic offset value.

In the infrared imaging device according to the present invention, it is preferable that the change amount calculation unit performs correction for reducing a difference in shading caused by the optical system between the reference subject value and the subject value on at least one of the reference subject value or the subject value and calculates a value acquired by subtracting the reference subject value on which the correction for reducing the difference in shading has been performed from the subject value on which the correction for reducing the difference in shading has been performed, as the subject value change amount.

In the infrared imaging device according to the present invention, it is preferable that the offset value calculation unit further has a shading correction unit that performs shading correction processing for correcting shading caused by the optical system on at least a part of pixel values of the corrected image before the subject value change amount is calculated by the change amount calculation unit.

The "shading caused by the optical system" means unevenness (variation) of the pixel value caused by the optical system. For example, as the shading caused by the optical system, there is a decrease in marginal light amount indicating that a light amount in a position spaced apart from an optical axis is further reduced than a light amount at an optical axis of the optical system.

In a case where the offset value calculation unit has the shading correction unit, it is preferable that the shading correction unit performs the shading correction processing on the pixel values corresponding to the plurality of pixels on the corrected image and the region detection unit detects the subject region based on the pixel values corresponding to the plurality of pixels on which the shading correction processing has been performed.

In a case where the offset value calculation unit has the shading correction unit, it is preferable that the shading correction unit performs the shading correction processing on the pixel values of the pixels included in the subject region and the pixel value calculation unit calculates the subject value based on the pixel values included in the subject region on which the shading correction processing has been performed.

In the infrared imaging device according to the present invention, it is preferable that the pixel value calculation unit calculates any one of a mode, an average value, and a median based on a histogram indicating a distribution of the pixel values of the subject region, as the subject value.

In the infrared imaging device according to the present invention, it is preferable that the region detection unit detects a region corresponding to a person, as the subject region.

In the infrared imaging device according to the present invention, it is preferable that the offset value calculation unit repeatedly calculates the representative offset value on a regular basis.

It is preferable that the infrared imaging device according to the present invention further comprises a basic correction data updating unit that performs basic correction data updating processing for correcting the basic correction data, a shutter that is positioned between the infrared detector and the optical system, and is openable and closable, and a control unit that causes the infrared detector to capture a shutter image in a state in which the shutter is closed for a period during which the subject region is not present on the corrected image, and causes the basic correction data updating unit to perform the basic correction data updating processing based on the shutter image.

The "period during which the subject region is not present in the corrected image" means a period during which the subject region is not substantially included in the corrected image. For example, the "period during which the subject region is not present in the corrected image" is not limited to a case where it is checked that the subject region is not present by detecting the presence or absence of the subject region from the corrected image, and includes a case where it is known that the subject region is not present on the corrected image.

According to an infrared imaging device according to the present invention and a signal correction method using the infrared imaging device according to the present invention, a representative offset value indicating a change amount of each pixel value of a plurality of pixels of an infrared detector which is caused by a temperature change based on information of an infrared image itself is calculated, and an infrared image is corrected based on the representative offset value. Thus, it is possible to correct the change in unevenness for each pixel caused by a temperature change without interrupting the capturing of an external environment.

BRIEF DESCRIPTION OF THE DRAWINGS

FIG. 3 is a diagram for describing a change of each pixel value caused by a temperature change.

FIG. 4 is a diagram showing an example of an infrared image influenced by the temperature change.

FIG. 5 is a diagram showing some pixels of an infrared detector.

FIG. 13 is a diagram showing an example of intrinsic value information according to the fourth embodiment.

FIG. 14A is a diagram showing an example of uncorrected basic correction data according to the fourth embodiment.

FIG. 14B is a diagram showing an example of corrected basic correction data according to the fourth embodiment.

DESCRIPTION OF THE PREFERRED EMBODIMENTS

Figure 1:
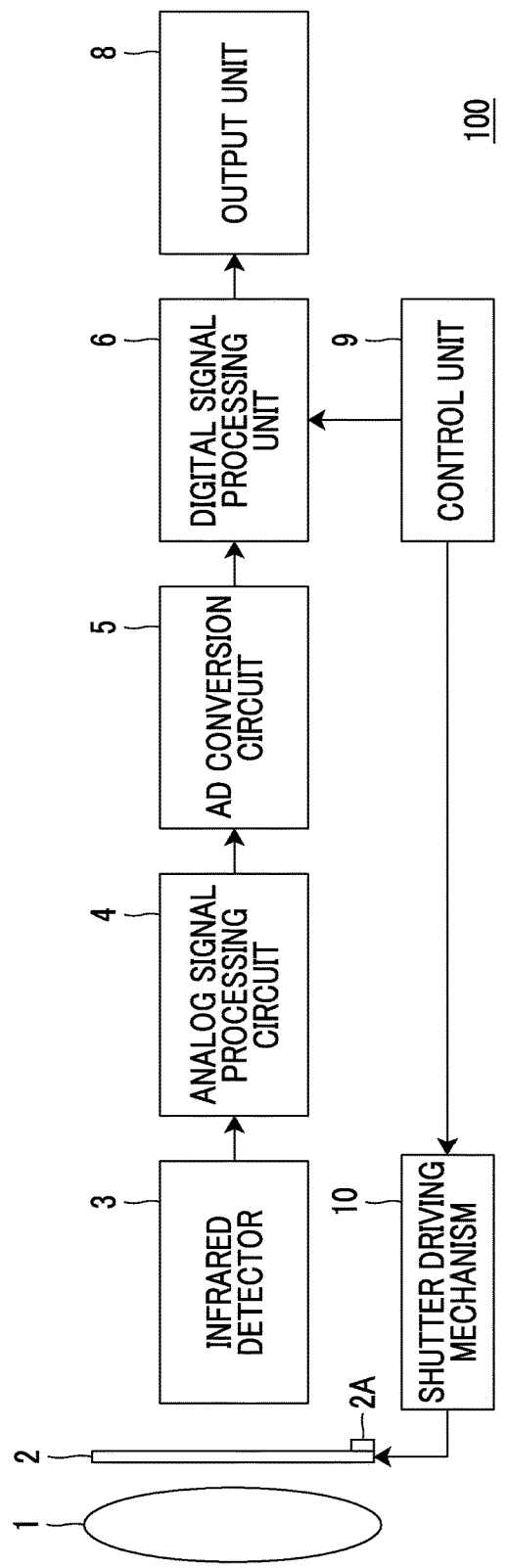
FIG. 1 is a schematic block diagram showing a configuration of an infrared imaging device according to an embodiment of the present invention.

Hereinafter, embodiments of the present invention will be described with reference the drawings. FIG. 1 is a schematic block diagram showing a configuration of an infrared imaging device 100 according to an embodiment of the present invention.

Initially, the infrared imaging device 100 according to one embodiment of the present invention includes an optical system 1 for capturing infrared rays, an infrared detector 3 that positions a detection surface on an image forming surface of the optical system 1 and detects the infrared rays passed through the optical system 1, a shutter 2 that is positioned between the infrared detector 3 and the optical system 1 and is openable and closable, an analog signal processing circuit 4 that performs known analog signal processing including amplification processing on pixel signals detected in the infrared detector 3, an analog-to-digital (AD) conversion circuit 5 that performs AD conversion on the pixel signals acquired through the analog signal processing, a digital signal processing unit 6 which is a digital signal processor that performs various signal correction processing including signal correction processing according to the embodiment of the present invention on an infrared image constituted by digital signals on which AD conversion processing has been performed, an output unit 8 that outputs an infrared image corrected by the digital signal processing unit 6, a control unit 9 that controls the capturing of the infrared image, and a shutter driving mechanism 10 that drives the shutter 2 controlled by the control unit 9. The infrared imaging device 100 includes a device main body which is not shown in FIG. 1, and these units are arranged in the imaging device main body.

The infrared detector 3 is constituted by an image sensor which is a solid-state imaging device acquired by arranging a plurality of infrared detection elements in a matrix shape. The pixels of the infrared detector 3 are infrared detection elements (infrared detectors) capable of detecting infrared rays (wavelength of 0.7 μm to 1 mm), and particularly, are infrared detection elements capable of detecting far-infrared rays (wavelength of 8 to 15 μm). For example, bolometer type or silicon on insulator (SOI) diode type infrared detection elements may be used as the infrared detection elements used as effective pixels or reference pixels.

The output unit 8 outputs the infrared image acquired through various digital signal processing including the signal correction processing according to the embodiment of the present invention to an external storage unit and a display unit (both not shown) through wireless or wired communication. Here, the external storage unit (not shown) is constituted by various storage media such as a hard disk. For example, the external storage unit may be constituted by a memory card type auxiliary storage device. The display unit (not shown) includes a known display such as a liquid crystal display, and displays the output infrared image. The external storage unit (not shown) stores the infrared image acquired from the output unit 8.

The control unit 9 comprehensively controls the entire device. For example, a programmable logic device (PLD) such as a field-programmable gate array (FPGA) may be used as the control unit 9. The control unit 9 switches an operation mode of the infrared imaging device 100 between a normal capturing mode and an updating mode of basic correction data. The control unit 9 controls the signal processing in the digital signal processing unit 6 depending on the operation mode according to a control signal. Specifically, the digital signal processing unit 6 performs correction processing in the normal capturing mode, and performs basic correction data updating processing in the updating mode of the basic correction data. In the updating mode of the basic correction data, the control unit 9 controls the shutter driving mechanism 10 such that an image side surface of the shutter 2 is controlled to be at a uniform reference temperature by a heater 2A provided in the shutter 2, and performs control for capturing a shutter image in a state in which the image side surface of the shutter 2 is controlled to be at the uniform reference temperature.

The digital signal processing unit 6 typically includes a processor, a read only memory (ROM) that stores a command for the processor, and a random access memory (RAM) that stores data, and these processor, ROM, and RAM are connected through a bus.

Figure 2:
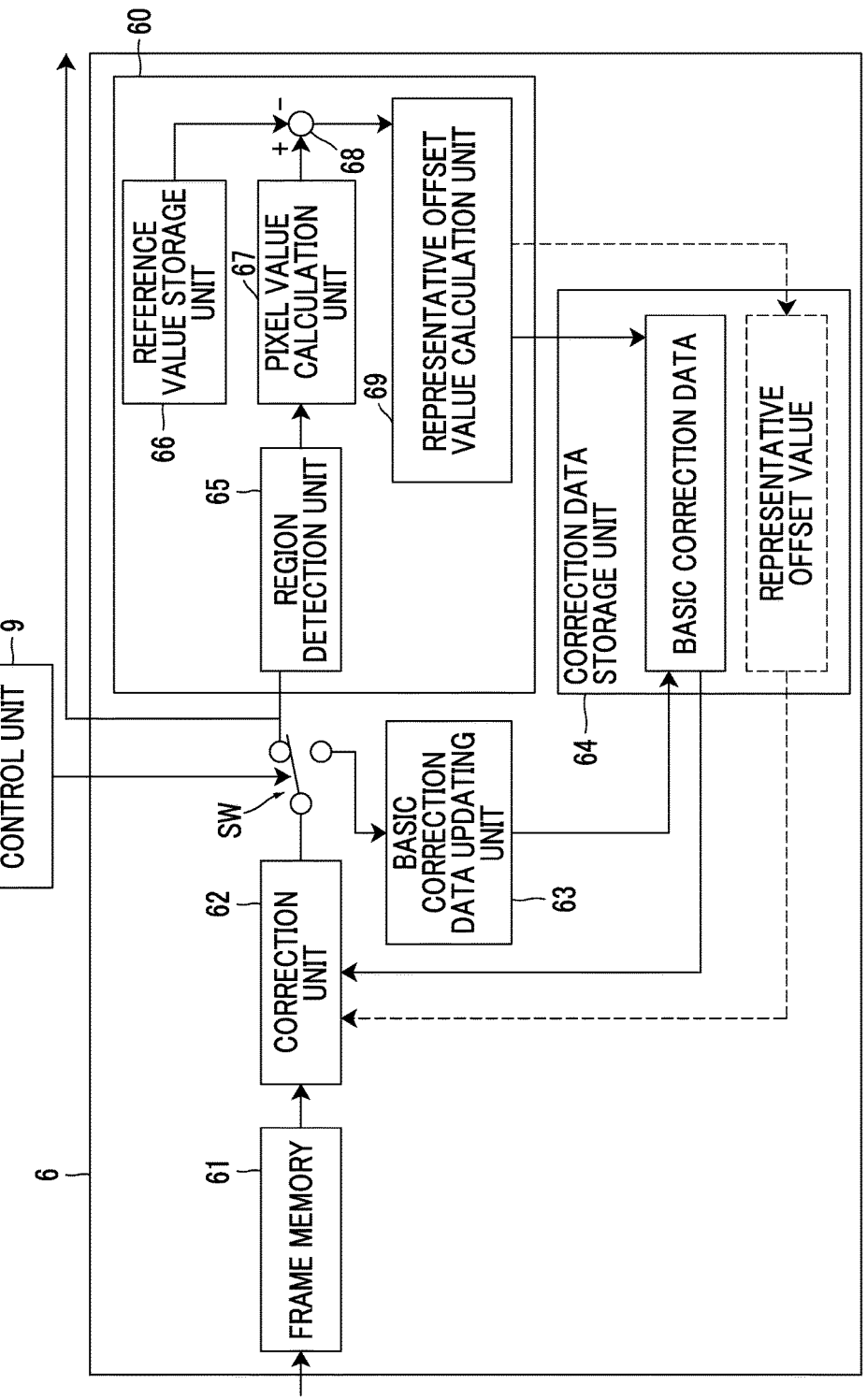
FIG. 2 is a block diagram showing a configuration of a digital signal processing unit according to a first embodiment.

FIG. 2 is a block diagram showing a detailed configuration of the digital signal processing unit 6 according to a first embodiment. As shown in FIG. 2, the digital signal processing unit 6 functions as a correction unit 62, an offset value calculation unit 60, a basic correction data updating unit 63, and a switch SW by the processor which operates according to the program stored in the ROM. The RAM of the digital signal processing unit 6 functions as a frame memory 61, a reference value storage unit 66, and a correction data storage unit 64. The digital signal processing unit 6 may have an interface connected to an external storage device. For example, the reference value storage unit 66 and the correction data storage unit 64 may be constituted by a rewritable non-volatile memory such as electrically erasable and programmable read only memory (EEPROM).

The frame memory 61 stores the infrared image which is a frame image detected in the infrared detector 3. The frame memory stores the infrared image as a processing target according to the necessity of image processing.

Another necessary correction processing is appropriately performed on a corrected image which is a corrected infrared image on which the signal correction processing has been performed by the digital signal processor of the infrared imaging device 100 after the signal correction processing is performed, and the corrected image is appropriately output by the output unit 8 to an external storage unit and a display unit (both not shown). For example, any processing such as gradation processing, edge emphasis processing, local contrast emphasis processing, sharpness adjustment processing and/or shading correction processing is performed on the corrected image.

The correction data storage unit 64 stores the basic correction data indicating a correction value of unevenness of each pixel. Here, each pixel value (each pixel signal) detected in each detector element (each pixel) of the infrared detector 3 has a variation component (unevenness component) intrinsic to the pixel. The basic correction data is data indicating the correction value corresponding to a value of the variation component of each pixel, and is a set of correction values of the pixels. In an initial state, the correction data storage unit 64 may store, as the basic correction data, the infrared images detected by the infrared detector 3 in a state in which the light source of a homogeneous light amount is provided in front of the infrared detector 3 and the infrared rays incident on the infrared detector 3 from the outside are blocked.

The correction unit 62 corrects the infrared image based on the basic correction data, and outputs the corrected image. Here, the correction unit 62 corrects (removes) the variation components included in the pixel values of the infrared image while referring to the basic correction data stored in the correction data storage unit 64. More specifically, an operation of offsetting the correction values corresponding to the variation components of the pixels of the pixel values from the pixel values of the infrared image captured by the infrared detector 3 is performed, and thus, the correction unit 62 outputs the pixel values depending on the amount of incident infrared rays by performing unevenness correction processing for removing the variation components intrinsic to the pixels.

The correction unit 62 corrects the infrared image based on a representative offset value and the basic correction data after the representative offset value is calculated. The correction unit 62 performs offset correction on the infrared image by using data acquired by increasing or decreasing the basic correction data by using the representative offset value. Here, the infrared image as a correction target of the correction unit 62 may be an infrared image used at the time of calculating the representative offset value, or may be an infrared image captured later by the infrared image used at the time of calculating the representative offset value.

The "offset correction is performed on the infrared image by using data acquired by increasing or decreasing the basic correction data by using the representative offset value" means that the correction for offsetting the representative offset value and the correction values of the pixels corresponding to the pixel values included in the basic correction data from the pixel values of the infrared image is performed. Consequently, the "offset correction is performed on the infrared image by using data acquired by increasing or decreasing the basic correction data by using the representative offset value" also includes any correction method of offsetting (removing) the representative offset value and the correction values of the pixels corresponding to the pixel values included in the basic correction data from the pixel values of the infrared image.

For example, in a case where the infrared detector 3 has 1 to n pixels, the correction unit 62 may perform the offset correction through any method in a range in which an output pixel value of an i-th ($1 \leq i \leq n$) pixel output by the correction unit 62 is (output pixel value corresponding to i-th pixel)−(input pixel value of i-th pixel)−(correction value of i-th pixel)−(representative offset value).

For example, in a case where the representative offset value and the basic correction data are stored in the correction data storage unit 64 as represented by a dashed line of FIG. 2, the correction unit 62 may perform the offset correction by subtracting the representative offset value and the correction values of the pixels corresponding to the pixel values included in the basic correction data from the pixel values of the infrared image as expressed by Expression (1) while referring to the representative offset value and the basic correction data. As in the present embodiment, in a case where the basic correction data of the correction data storage unit 64 is updated by the basic correction data to which the representative offset value is added, the correction unit 62 may perform the offset correction by subtracting the correction values of the pixels corresponding to the pixel values included in the updated basic correction data from the pixel values of the infrared image, as expressed by Expression (1-1) to be described below.

(output pixel value corresponding to *i*-th pixel)=(input pixel value of *i*-th pixel)−(correction value of *i*-th pixel)−(representative offset value)    (1)

Consequently, as long as the correction unit 62 corrects (removes) at least the representative offset value and the corresponding correction values included in the basic correction data from the pixel values of the infrared image, the correction unit may perform the correction processing by using an additional correction value in addition to the representative offset value and the correction value included in the basic correction data.

The corrected image which is the infrared image on which the unevenness correction processing has been performed by the correction unit 62 is input to the switch SW. The switch SW selectively outputs the corrected image to the offset value calculation unit 60 and the basic correction data updating unit 63. For example, the switch SW is switched based on a control signal output by the control unit 9. The control unit 9 outputs the corrected image to the offset value calculation unit 60 from the switch SW in the normal capturing mode. The control unit instructs the offset value calculation unit 60 to calculate the offset value. Meanwhile, the control unit 9 outputs the corrected image to the basic correction data updating unit 63 from the switch SW in the updating mode of the basic correction data. The control unit 9 instructs the basic correction data updating unit 63 to update the basic correction data.

The basic correction data updating unit 63 updates the basic correction data. In a case where the operation mode is the basic correction data updating mode, the shutter image captured in which the image side surface of the shutter 2 is controlled to be at the uniform reference temperature is input to the basic correction data updating unit 63 through the switch SW. The basic correction data updating unit 63 calculates a correction value at which each pixel becomes a uniform output value through a known method for each pixel based on the shutter image, and acquires the basic correction data which is the set of correction values for each pixel. The basic correction data stored in the correction data storage unit 64 is updated by the acquired basic correction data. On the shutter image acquired by capturing the shutter of which the temperature is uniform, the pixel value on the shutter image is the sum of a value of an intrinsic variation component for each pixel and a uniform pixel value incident from a subject. Thus, for example, the basic correction data updating unit 63 may acquire the pixel value data of the shutter image as the basic correction data. The basic correction data may be created at the time of manufacturing the infrared imaging device 100, and may be stored in the correction data storage unit 64. The infrared imaging device 100 may omit the basic correction data updating unit 63 and the switch SW.

Here, the basic correction data updating unit 63 performs the basic data updating processing in a case where a condition in which a person region is not detected from a previous corrected image is satisfied. Specifically, the basic correction data updating unit 63 performs the updating processing of the basic correction data in a case where a set time interval elapses after the previous updating processing of the basic correction data is performed and an updating condition in which a person region is not detected from the previous corrected image by a region detection unit 65 is satisfied.

The time interval at which the basic correction data is updated may be any time interval to be required, or may be a constant time interval or different time intervals according to specifications of the device or requirements. For example, it is considered that the time interval is set to be shorter in a case where the amount of infrared rays due to external factor irrespective of a capturing target such as a substrate temperature (particularly, sensor temperature) and a casing temperature of the infrared imaging device 100 is frequently varies and the time interval is set to be long in a case where the amount of infrared rays due to the external factor does not much change. For example, the time interval may be about two or three minutes.

The basic correction data updating unit 63 may update the basic correction data through any method. For example, the optical system is in an unfocusing state, and thus, light rays are equally incident on the infrared detector 3 in all directions within a view field of observation of the optical system. That is, luminous flux incident on the optical system in various directions is equally incident on the detection surface of the infrared detector 3 without being formed in a particular point of the infrared detector 3. The basic correction data updating unit 63 may update the basic correction data by using an image captured by setting the optical system in the unfocusing state.

For example, the basic correction data updating unit 63 may acquire the fixed pattern noise data acquired through the method described in JP2001-336983A, as the basic correction data. According to the method described in JP2001-336983A, an error between a processed image acquired by subtracting the fixed pattern noise data from the infrared image output by the infrared detector and expected value data of the fixed pattern noise data is calculated in a state in which the optical system is set to be out of focus. Negative feedback for giving feedback data based on the error as the fixed pattern noise data to a subtractor is performed, and feedback data in a case where output image data of the subtractor and the expected value data are substantially equal to each other is retained as the fixed pattern noise data.

A case where the basic correction data is updated means that the basic correction data stored in the correction data storage unit 64 is rewritten with new data. The updating of the basic correction data includes not only updating of the correction values corresponding to all the pixels included in the infrared detector 3 all at once but also updating for partially updating the correction values correction some pixels.

Here, a principle according to a technology of the present invention for correcting unevenness for each pixel included in the pixel value of each pixel will be described. Particularly, the present invention takes notice that the variation in each pixel value caused by a temperature change from the pixel value of each pixel is suppressed. FIG. 3 is a diagram showing signal components depending on the incident infrared rays and variation components in the pixel values (output pixel values) detected in the infrared detector 3. As shown in FIG. 3, as for five pixels P1 to P5, each of pixel values of the five pixels P1 to P5 is the sum of each of signal components D1 to D5 depending on the incident infrared rays from the subject and the intrinsic variation component of each of the pixels represent by a diagonal line in the drawing. The variation components of the five pixels P1 to P5 include components A1 to A5 which are not changed with a temperature change and temperature dependent components B1 to B5 which change with a temperature change, respectively.

Pixel values at the reference temperature are represented on the left of FIG. 3, and pixel values at another temperature changed from the reference temperature are represented on the right of FIG. 3. In a case where the basic correction data is the set of correction values corresponding to the variation components of the pixels at the reference temperature, the variation components may be appropriately corrected (removed) at the reference temperature by using the basic correction data. However, in a case where the temperature is changed from the reference temperature, the temperature dependent components B1 to B5 are increased or decreased as represented by arrows in the temperature dependent components B1 to B5. Thus, for example, in a case where the pixel values at another temperature on the right of FIG. 3 are corrected by using the basic correction data corresponding to the reference temperature, the increased portions (the portions of the arrows in the temperature dependent components B1 to B5) in the temperature dependent components B1 to B5 remain in the pixel values to be output, and the pixel values may be shifted so as to be increased as a whole. In contrast, in a case where the temperature dependent components B1 to B5 are decreased, the pixel values corrected as much as the decreased portions of the temperature dependent components B1 to B5 are inappropriately decreased, and the pixel values are shifted so as to be decreased as a whole. As stated above, there is a problem that the pixel values of the corrected image acquired through the unevenness correction processing are changed due to the temperature change.

FIG. 4 shows a corrected image acquired by correcting the infrared image captured at the reference temperature and a corrected image acquired by correcting the infrared image captured at another temperature different from the reference temperature in order from the left. The unevenness correction processing is performed on both the corrected images by using the basic correction data corresponding to the reference temperature. Persons each having a body temperature within a known temperature range are respectively included on the images on the left and right of FIG. 4. On the corrected image which corresponds to the temperature different from the reference temperature and is shown on the right of FIG. 4, the pixel values in the image are changed as a whole due to the change of the temperature dependent components even though there is little difference in the body temperature of the person on both images, and the pixel values of the person region are decreased.

In order to suppress the change of the pixel values, it is preferable that the basic correction data is repeatedly acquired on a regular basis and the unevenness correction processing of the infrared image is performed by using the obtained basic correction data. However, in the method of the related art, in order to acquire the image for the basic correction data, a period during which an external environment is not able to be captured appears in the acquisition of the basic correction data. However, for example, in the infrared imaging device 100 to be mounted on the vehicle, an observer wants to observe the external environment by delaying the updating of the basic correction data and capturing the external environment with no interruption for a period during which a subject to be noticed, such as a pedestrian, is included in the infrared image. A situation in which the observer wants to capture the external environment with no interruption may be continued for a predetermined period. In such a case, it is preferable that the change of the pixel values caused by the temperature change is able to be corrected without interrupting the capturing of the external environment.

The present invention takes notice that pixel values of a target subject known to maintain an approximately constant temperature irrespective of a surrounding temperature are used in order to correct the change of the pixel values caused by the temperature change. For example, in a case where a target subject having a temperature in a known particular temperature range, such as a human body, is present on the infrared image, the amount of infrared rays incident from the target subject is presumed to maintain an approximately constant value irrespective of the surrounding temperature. Thus, in a case where the pixel values of the target subject are changed, it is considered that the change amount of each changed pixel value represents the change amount of each pixel value caused by the temperature change. The temperature change that influences the pixel values is a temperature change of the external environment, temperature changes of the imaging device main body, the circuit board, and the pixel itself caused by the electric conduction of the circuit board, and is presumed to cause a temperature change similar to the entire infrared detector 3. Thus, in the present invention, the change amount of each pixel value of the target subject represents the change amount of each pixel value of the plurality of pixels included in the entire infrared detector 3.

Thus, the offset value calculation unit 60 includes a representative offset value calculation unit 69 to be described below, and calculates the change amount of each pixel value as a subject value by the representative offset value calculation unit 69, as the representative offset value which indicates the change amount of each pixel value of the plurality of pixels of the infrared detector 3 and is the change amount caused by the temperature change. The correction unit 62 performs the offset correction so as to negate the change of the temperature dependent components of the pixel values of the infrared image based on the representative offset value.

The offset value calculation unit 60 has a region detection unit 65, a pixel value calculation unit 67, a change amount calculation unit 68, and a representative offset value calculation unit 69. Hereinafter, an example in which the offset value calculation unit 60 performs a process of calculating the change amount (subject value change amount) of the pixel values of the subject of the right image of FIG. 4, as the representative offset value, from the pixel values of the subject of the image on the left of FIG. 4 will be described with reference to FIG. 4. The correction unit 62 corrects the change (decrease) of the pixel values caused by the temperature change shown on the right image of FIG. 4 by performing correction for reducing the change of the pixel values by using the representative offset value, and corrects such that the pixel values of the subject of the right image of FIG. 4 become the pixel values corresponding to the pixel values of the subject of the left image of FIG. 4.

The region detection unit 65 acquires the corrected image on which the unevenness correction processing has been performed by the correction unit 62, and detects a subject region R corresponding to the target subject from the corrected image. Here, the region detection unit 65 detects a pixel set indicating a temperature in the reference range corresponding to a person temperature from the infrared image through the known method, and extracts an edge of the detected pixel set. The person is detected from the infrared image by performing pattern recognition by using a pattern indicating a known person shape on the extracted edge.

Here, the region detection unit 65 acquires the corrected image shown on the right of FIG. 4, detects a head (face) of the subject from the corrected image, and extracts a rectangular region including the head as the subject region R. The region detection unit 65 may adopt any method as long as a method capable of detecting the subject as the target from the infrared image is used. For example, in a case where the person region is detected, the region detection unit 65 may adopt a method of detecting the subject region R described in JP2005-96752A.

As mentioned above, in a case where the region detection unit 65 detects the region corresponding to the person as the subject region R, it is possible to perform correction for suppressing the change caused by the temperature change of the infrared image by accurately calculating the representative offset value based on the pixel values of the person region having the temperature in the known human body temperature. Any object having a temperature in the known particular range may be the target subject depending on a purpose of installation of the imaging device or an observation target. For example, the region detection unit 65 may be configured to detect a region such as a homeothermic animal other than a person, as a region corresponding to the target subject.

The pixel value calculation unit 67 calculates a subject value indicating the pixel values of the subject region R detected by the region detection unit 65. Here, the pixel value calculation unit 67 calculates a mode of the subject region R, as the subject value, based on a histogram indicating the distribution of the pixel values of the subject region R. For example, the pixel value calculation unit 67 may calculate any one of an average value and a median, as the subject value, based on the histogram indicating the distribution of the pixel values of the subject region R. In these cases, an appropriate value is used as the subject value which is a representative pixel value of the subject region R, and thus, it is possible to accurately calculate the change of the pixel values of the subject region R.

The pixel value calculation unit 67 may calculate the subject value through any method by using the subject value indicating the pixel values of the subject region R. For example, an addition average value or a weighted addition average value of the pixel values of the subject region R may be used as the subject value, or the subject value may be calculated based on a pixel value of a particular position or the pixel values of the plurality of selected pixels of the subject region R.

The change amount calculation unit 68 calculates the subject value change amount which is the change amount of each pixel value of the subject region R based on the reference subject value and the subject value calculated by the pixel value calculation unit 67. Specifically, the change amount calculation unit 68 calculates a value of a difference acquired by subtracting the reference subject value from the subject value calculated from the infrared image as the target by the pixel value calculation unit 67, as the subject value change amount, while referring to the reference subject value stored in the reference value storage unit 66. Here, 100 is calculated as the reference subject value from the left image of FIG. 4, and is stored in the reference value storage unit 66. In a case where the pixel value calculation unit 67 calculates 90 as the subject value from the right image of FIG. 4, the change amount calculation unit 68 calculates a value (90−100=−10) acquired by subtracting the reference subject value (100) from the subject value (90), as the subject value change amount.

The reference subject value is the subject value calculated from a reference infrared image as a reference. It is preferable that the unevenness correction processing is performed on the reference subject value and the subject value acquired from the infrared image as the target by using the same basic correction data, the subject region R is detected through the same method, and the subject value in the subject region R is calculated through the same method. It is preferable that an infrared image which is captured in a time as close as possible to a time when the image for acquiring the basic correction data is captured and includes the subject is used as the reference infrared image.

A method of calculating the reference subject value from the corrected reference image shown on the left of FIG. 4 will be described. In a case where the operation mode is changed from the basic correction data updating mode to the normal capturing mode, the captured infrared image is stored in the frame memory 61, and the digital signal processing unit 6 outputs the corrected image processed by the correction unit 62 that performs the unevenness correction processing on the infrared image stored in the frame memory 61 based on the basic correction data. The region detection unit 65 detects the subject region R from the corrected image. In a case where the subject region R is detected, the pixel value calculation unit 67 calculates the mode of the subject region R, as the reference subject value, from the subject region R of the corrected image based on the histogram indicating the distribution of the pixel values of the subject region R, and stores the reference subject value in the reference value storage unit 66.

A series of processing for storing the infrared image in the frame memory 61 whenever the infrared image is captured, outputting the corrected image acquired by performing the unevenness correction processing on the stored infrared image, and detecting the subject region R in the corrected image are repeated until the subject region R is detected. In such a case, the reference infrared image is the infrared image corresponding to the corrected image from which the subject region R has been initially detected after the operation mode is changed from the basic correction data updating mode to the normal capturing mode.

In such a case, it is possible to decrease a time interval between a time when the basic correction data is acquired and a time when the reference subject value is acquired as small as possible. Thus, it is possible to calculate the reference subject value in a state in which a difference between the temperature of the external environment and the circuit board at the time of acquiring the basic correction data and the temperature of the external environment and the circuit board at the time of acquiring the reference subject value is decreased as small as possible. Thus, the reference subject value approaches the pixel value corresponding to the temperature at the time of acquiring the basic correction data, and thus, a subject value change amount approximately indicating the change of the pixel values caused by the temperature change at the time of acquiring the basic correction data is calculated. Accordingly, it is possible to appropriately correct the change of the pixel values caused by the temperature change from when the basic correction data is acquired by using the subject value change amount as the representative offset value. Any infrared image captured in the infrared detector 3 earlier than a time when the infrared image as the target is captured may be used as the reference infrared image.

The representative offset value calculation unit 69 calculates the subject value change amount as the representative offset value. The representative offset value calculation unit 69 updates the basic correction data stored in the correction data storage unit 64 by using data acquired by performing the offset operation (increasing or decreasing) on the correction values of the basic correction data by using the representative offset value. The representative offset value calculation unit 69 may store the representative offset value in another correction data storage unit 64 different from the correction data storage unit which stores the basic correction data.

Figures 6A, 6B, 7:
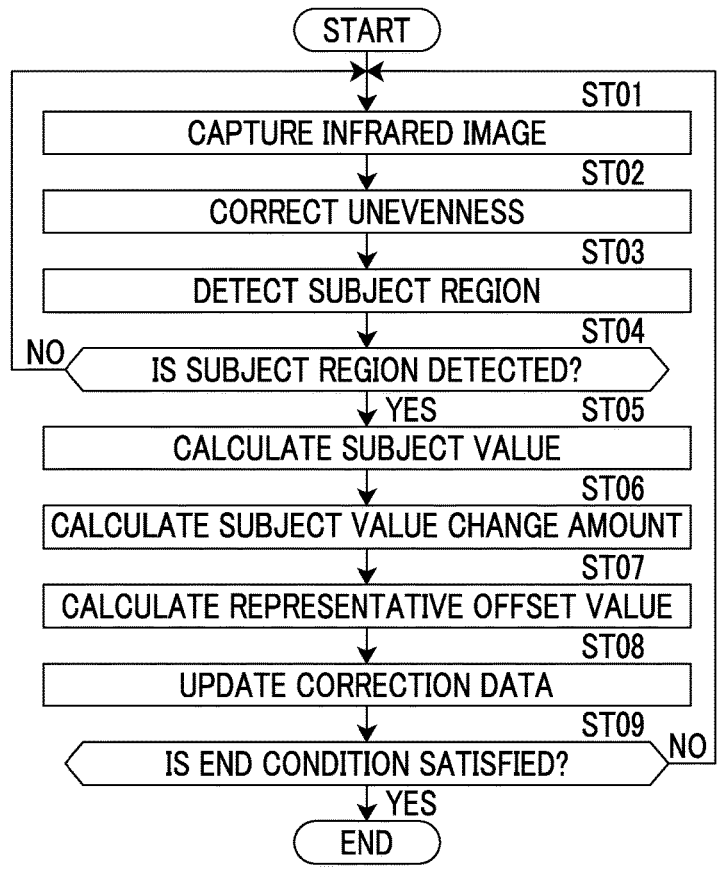
FIG. 6A is a diagram showing an example of uncorrected basic correction data corresponding to the pixels shown in FIG. 5.
FIG. 6B is a diagram showing an example of corrected basic correction data corresponding to the pixels shown in FIG. 5.
FIG. 7 is a flowchart showing signal correction processing according to the first embodiment.

An example in which the representative offset value calculation unit 69 performs a process of updating the basic correction data by using the representative offset value will be described with reference to FIGS. 5, 6A, and 6B. FIG. 5 shows 5×5 pixels P1 to P25 which are some of the pixels of the infrared detector 3. FIGS. 6A and 6B show correction values corresponding to the pixels P1 to P25 in positions corresponding to the pixels P1 to P25 of FIG. 5, as the basic correction data. FIG. 6A shows the basic correction data before the updating processing is performed by the representative offset value calculation unit 69, and FIG. 6B shows the basic correction data after the updating processing is performed by the representative offset value calculation unit 69. As shown in FIG. 6A and the like, the basic correction data is a set of intrinsic correction values for correcting (removing) the unevenness (the variation component for each pixel) of the pixel for each pixel.

All the values shown in FIGS. 6A and 6B are values simplified for the sake of convenience in description, and are values different from the actual values. Although 5×5 pixels has been described for the sake of convenience in description, the representative offset value calculation unit 69 performs the updating processing on all the n pixels included in the infrared detector 3.

Here, the representative offset value calculation unit 69 calculates the subject value change amount (−10) described above, as the representative offset value, calculates the basic correction data on which the offset operation has been performed, which is shown in FIG. 6B, by performing the offset operation for satisfying (correction value corresponding to i-th pixel)=(correction value corresponding to i-th pixel)+(representative offset value) on the correction value corresponding to each pixel Pi (1≤i≤25) of the basic correction data, which is shown in FIG. 6A, and updates the basic correction data stored in the correction data storage unit 64 by using the basic correction data on which the offset operation has been performed. It can be seen that the correction values shown in FIG. 6A are acquired by adding the representative offset value (−10) to the correction values shown in FIG. 6B.

In a case where the representative offset value is calculated, the correction unit 62 performs the unevenness correction processing by subtracting the correction values of the pixels corresponding to the pixel values from the pixel values of the infrared image based on the basic correction data stored in the correction data storage unit 64. That is, the correction unit 62 performs the unevenness correction processing on the input infrared image by performing the offset operation expressed by Expression (1-1) on the i-th pixel (1≤i≤n) of the infrared image based on the updated correction data, and outputs the corrected image.

(output pixel value corresponding to *i*-th pixel)=(input pixel value of *i*-th pixel)−(updated correction value of *i*-th pixel)=(input pixel value of *i*-th pixel)−((correction value of *i*-th pixel)+(representative offset value)) (1-1)

FIG. 7 is a flowchart showing a flow of the signal correction processing according to the first embodiment. The flow of the signal correction processing will be described in detail with reference to FIG. 7.

Initially, in the normal capturing mode, in a case where the infrared imaging device 100 captures the infrared image, the captured infrared image is stored in the frame memory 61 (ST01). The correction unit 62 performs the unevenness correction processing on the infrared image stored in the frame memory 61 while referring to the correction data storage unit 64 (ST02). Specifically, the corrected image is output by subtracting the correction values of the pixels corresponding to the pixel values from the pixel values of the infrared image based on the basic correction data. Subsequently, the region detection unit 65 detects the subject region R from the corrected image (ST03). In a case where the subject region R is not detected (ST04, NO), the processes of ST01 to ST03 are repeated. Meanwhile, in a case where the subject region R is detected (ST04, YES), the pixel value calculation unit 67 calculates the subject value based on the pixel values of the detected subject region R (ST05). Subsequently, the change amount calculation unit 68 calculates a difference acquired by subtracting the reference subject value from the subject value, as the subject value change amount (ST06), and the representative offset value calculation unit 69 calculates the calculated subject value change amount as the representative offset value (ST07). Here, the representative offset value calculation unit 69 updates the basic correction data stored in the correction data storage unit 64 by using the calculated representative offset value (ST08). In a case where an end condition is not satisfied (ST09, NO), the infrared imaging device 100 repeats the processes of ST01 to ST08. In a case where the end condition is satisfied (ST09, YES), the infrared imaging device 100 ends the process.

According to the above-described embodiment, the representative offset value indicating the change amount of each pixel value of the plurality of pixels of the infrared detector 3 which is caused by the temperature change is calculated based on information of the infrared image itself, and the infrared image is corrected based on the representative offset value and the basic correction data. Thus, it is possible to correct the change of the pixel values caused by the temperature change without interrupting the capturing of the external environment.

In the above-described embodiment, the basic correction data updating unit 63 is provided, the basic correction data updating unit 63 updates the basic correction data in a case where an updating condition in which the person is not detected from the lately captured infrared image is satisfied, and the offset value calculation unit 60 calculates the representative offset value in a case where the subject is detected. The correction unit 62 performs the unevenness correction processing by performing the offset correction on the infrared image based on data acquired by increasing or decreasing the basic correction data by using the representative offset value.

Thus, in a case where the person which is the subject to be noticed is captured, since the updating processing of the basic correction data that causes the stopping of the capturing on the outside is not performed, it is possible to continue the capturing in the normal capturing mode. Since the representative offset value is appropriately calculated depending on whether or not the subject region R is detected in the normal capturing mode, it is possible to appropriately correct the change amount of each pixel value of the plurality of pixels caused by the temperature change even though the capturing is stopped and the basic correction data is not updated. It is possible to appropriately update the basic correction data in a state in which the person which is the subject to be noticed is not captured. Thus, the correction unit 62 can acquire the correction data corresponding to the appropriate temperature change depending on whether or not the subject to be noticed is present, and can appropriately perform the unevenness correction processing based on the acquired correction data.

As in the above-described embodiments, the offset value calculation unit 60 repeatedly calculates the representative offset value on a regular basis, it is possible to appropriately correct the change amount of each pixel value caused by the temperature change. As stated above, in a case where the subject region R is detected for each frame image and the representative offset value is calculated whenever the subject region R is detected, since the representative offset value is able to be appropriately suitable for the temperature change, the above-described effect is particularly remarkable.

The offset value calculation unit 60 may perform the calculation processing of the representative offset value or the calculation processing of the intrinsic offset value to be described below at a time interval.

The updating condition in which the updating processing of the basic correction data of the basic correction data updating unit 63 is performed may be arbitrarily set.

The control unit 9 may be configured to instruct that the offset value calculation processing (representative offset value calculation processing or the intrinsic offset value calculation processing to be described below) of the offset value calculation unit 60 is to be performed irrespective of the updating condition of the basic correction data updating unit 63.

For example, the offset value calculation unit 60 may calculate the representative offset value or may calculate the intrinsic offset value to be described below at a set time interval. In this case, it is considered that the time interval is set to be shorter in a case where the amount of infrared rays due to external factor irrespective of a capturing target such as a substrate temperature (particularly, sensor temperature) and a casing temperature of the infrared imaging device 100 is frequently varies and the time interval is set to be long in a case where the amount of infrared rays due to the external factor does not much change. For example, the time interval at which the offset value calculation unit 60 calculates the representative offset value may be set to be equal to or less than three minutes or equal to or less than five minutes.

For example, a temperature sensor (not shown) for detecting the temperature change is may be provided outside or inside the infrared imaging device 100, and the control unit 9 may monitor the temperature change based on a measurement value of the temperature sensor. In a case where the temperature change is observed, the control unit may instruct the offset value calculation unit 60 to perform the calculation processing (alternatively, both the calculation processing of the representative offset value and the calculation processing of the intrinsic offset value) of the representative offset value. In this case, for example, the control unit may monitor the measurement value of the temperature sensor, may determine whether or not the measurement value is equal to or greater than a threshold value, and may determine the change of the temperature which is equal to or greater than the reference value.

Even in a state in which any updating condition based on lapse of time or a temperature change is satisfied, in a case where a situation in which it is not preferable that the updating processing of the basic correction data of the basic correction data updating unit 63 is performed such as a situation in which the observer does not want to stop the capturing of the image is detected, the control unit 9 may postpone the updating processing of the basic correction data of the basic correction data updating unit 63, and may instruct that the offset value calculation processing of the offset value calculation unit 60 is to be performed. In this case, it is preferable that the control unit 9 appropriately instructs that the offset value calculation processing of the offset value calculation unit 60 is to be performed until the situation in which it is not preferable that the updating processing is performed is resolved. In this case, it is possible to suppress the change of the pixel values caused by the temperature change by performing the offset value calculation processing while continuously outputting the corrected image including the subject to be noticed to the output unit 8 depending on whether or not the situation in which it is not preferable that the updating processing of the basic correction data of the basic correction data updating unit 63 is performed occurs.

As stated above, the subject value change amount is calculated as the representative offset value, and thus, it is possible to easily and appropriately correct the change amount of each pixel value caused by the temperature change from the pixel values of the infrared image in a case where the offset correction is performed on the infrared image based on the data acquired by increasing or decreasing the basic correction data by the representative offset value.

Hereinafter, a second embodiment will be described with reference FIGS. 8A and 8B. The second embodiment is different from the first embodiment in that the change amount calculation unit 68 performs correction for reducing a difference in shading (lens shading) caused by the optical system 1 between the reference subject value and the subject value on at least one value of the reference subject value or the subject value and the value acquired by subtracting the reference subject value on which the correction for reducing the difference in shading has been performed from the subject value on which the correction for reducing the difference in shading has been performed is calculated as the subject value change amount.

Figure 8A:
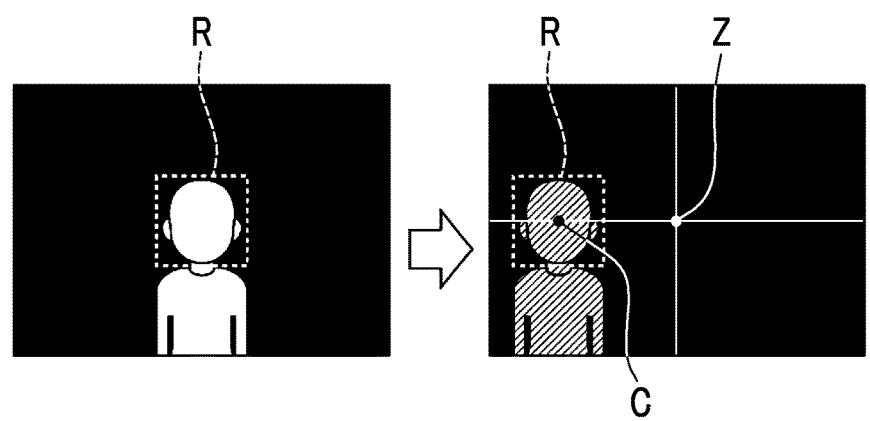
FIG. 8A is a diagram showing another example of the infrared image influenced by the temperature change.
Figure 8B:
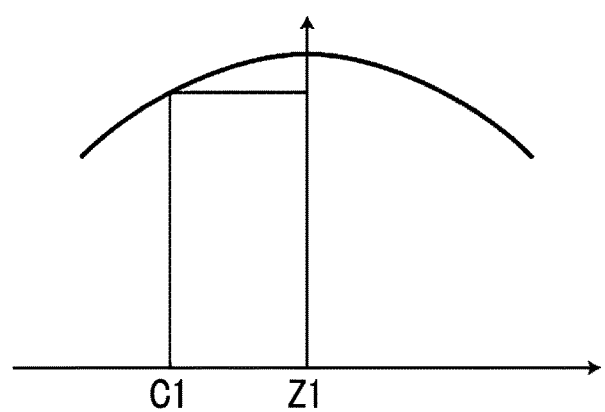
FIG. 8B is a diagram for describing shading due to an optical system.

FIG. 8A shows a corrected image acquired by correcting the infrared image (reference infrared image) captured at the reference temperature and a corrected image acquired by correcting the infrared image captured at the temperature different from the reference temperature in order from the left. The unevenness correction processing is performed on both the corrected images by using the basic correction data corresponding to the reference temperature. Here, the person region is positioned in an image center Z on the left image of FIG. 8A, and the person region is positioned in a position C spaced apart from the image center Z on the right image of FIG. 8B. FIG. 8B shows conceptually a light amount distribution incident on pixels on the detection surface in a case where a subject having a uniform temperature is captured. FIG. 8B is the light amount distribution of the pixels on a straight line included in the detection surface of the infrared detector 3, and the straight line is a straight line passing through a position (a position Z1 corresponding to an optical axis) on the detection surface corresponding to the image center Z in FIG. 8A and a position (C1) on the detection surface corresponding to the center C of the subject region R. As shown in FIG. 8B, it can be seen that the light amount is reduced through the lens shading in the position C1 of the subject region R spaced apart from the position Z1 corresponding to the optical axis.

As shown in FIG. 8A, in a case where the positions of the subject regions R are different on the corrected image used in the detection of the reference subject value and the corrected image used in the detection of the subject value, the change of the pixel values due to the lens shading is different depending on the positions of the subject regions R in the reference subject value and the subject value. For example, in the example of FIG. 8A, since the subject region R of the right image is positioned in the position C spaced apart from the image center Z corresponding to the optical axis, a decrease in the pixel value caused by the temperature change and a decrease in the pixel value due to the lens shading occur in the subject value. Meanwhile, in the reference subject value of the left image, since the subject region R is positioned in the image center Z corresponding to optical axis, a decrease in the pixel value due to the lens shading does not occur in the reference subject value.

In this case, in a case where a difference value acquired by subtracting the reference subject value from the subject value is simply used as the subject value change amount, the subject value change amount is acquired by reflecting not only the decrease in the pixel value caused by the temperature change but also the difference in lens shading between both the images. It is preferable that the subject value change amount is calculated in a state in which the influence of the difference in lens shading between the reference subject value and the subject value is removed in order for the subject value change amount to indicate the change of the pixel values caused by the temperature change.

Thus, in the second embodiment, the change amount calculation unit 68 performs the correction for reducing the difference in shading caused by the optical system 1 between the reference subject value and the subject value on at least one of the reference subject value or the subject value, and calculates the value acquired by subtracting the reference subject value on which the correction for reducing the difference in shading has been performed from the subject value on which the correction for reducing the difference in shading has been performed, as the subject value change amount. The configurations or functions of the units in the second embodiment other than the change amount calculation unit 68 are common to the first embodiment, and thus, only different portions will be described.

The example of FIG. 8A will be described. Here, the change amount calculation unit 68 specifies a reference position which i the position of the subject region R of the reference infrared image and the position C which is the position of the subject region R detected from the infrared image, as shown in FIG. 8A. The position of the subject region R is specified as the position of the center of the subject region R. Based on information indicating the lens shading of the plurality of pixels of the infrared detector 3 which is acquired in advance at the time of manufacturing the device as shown in FIG. 8B, the change amount calculation unit 68 calculates the subject value change amount by converting the reference subject value in a case where the subject region R is position in the reference position into the reference subject value in a case where the subject region R is positioned in the position C and subtracting the converted reference subject value from the subject value in which the subject region R is positioned in the position C by using the following Expression (2).

(subject value change amount in position C)=(subject value in position C)−(reference subject value of reference position)×(light amount in position C/light amount in reference position)  (2)

On the left image of FIG. 8A, the reference subject value in a case where the subject is positioned in the reference position which is the image center Z is 100. It is assumed that the light amount in the position C1 corresponding to the subject region R with respect to the light amount in the position Z1 corresponding to the optical axis is 80% based on FIG. 8B. The change amount calculation unit 68 converts the reference subject value (100) in a case where the subject region R is positioned in the reference position into the reference subject value (80) in a case where the subject region R is positioned in the position C based on a ratio (80/100) of the light amount in the position C to the light amount in the reference position while referring to the information indicating the lens shading. A value acquired by subtracting the reference conversion value (80) in a case where the subject region R is positioned in the position C from the subject value (70) in a case where the subject region R is positioned in the position C is acquired as the subject value change amount (−10). As stated above, the reference subject value in a case where the subject region R is positioned in the reference position is converted into the reference subject value in a case where the subject region R is positioned in the position C based on the information indicating the lens shading, and thus, it is possible to accurately calculate the subject value change amount in a case where the correction for reducing the difference in lens shading between the reference subject value and the subject value is performed.

The position of the subject region R in the reference infrared image is appropriately selected as the reference position. Similarly to the first embodiment, in the second embodiment, the pixel value calculation unit 67 may calculate the subject value through any method for indicating the representative pixel value of the subject region R. The change amount calculation unit 68 may adopt any correction method capable of reducing (negating) the difference in lens shading between the reference subject value and the subject value. For example, in order to reduce (negate) the difference in lens shading between the reference subject value and the subject value, the change amount calculation unit 68 may convert the subject value in a case where the subject region R is positioned in the position C into the subject value in a case where the subject region R is positioned in the reference position, or may respectively convert both the reference subject value in a case where the subject region R is positioned in the reference position and the subject value in a case where the subject region R is positioned in the position C into a reference subject value in a case where the subject region R is positioned in a third position and a subject value in a case where the subject region R is positioned in the third position.

As stated above, in a state in which the difference in lens shading between the reference subject value and the subject value is negated due to a difference between the subject positions, in a case where the subject value change amount is calculated, the pixel values of the infrared image are corrected by using the subject value change amount as the representative offset value in order for the subject value change amount to more remarkably indicate the change of the pixel values caused by the temperature change, and thus, it is possible to more accurately perform the unevenness correction processing. The subject value change amount from which the difference in shading has been negated is calculated by using the subject value and the reference subject value, and thus, it is possible to easily and accurately calculate the subject value change amount.

Figure 9:
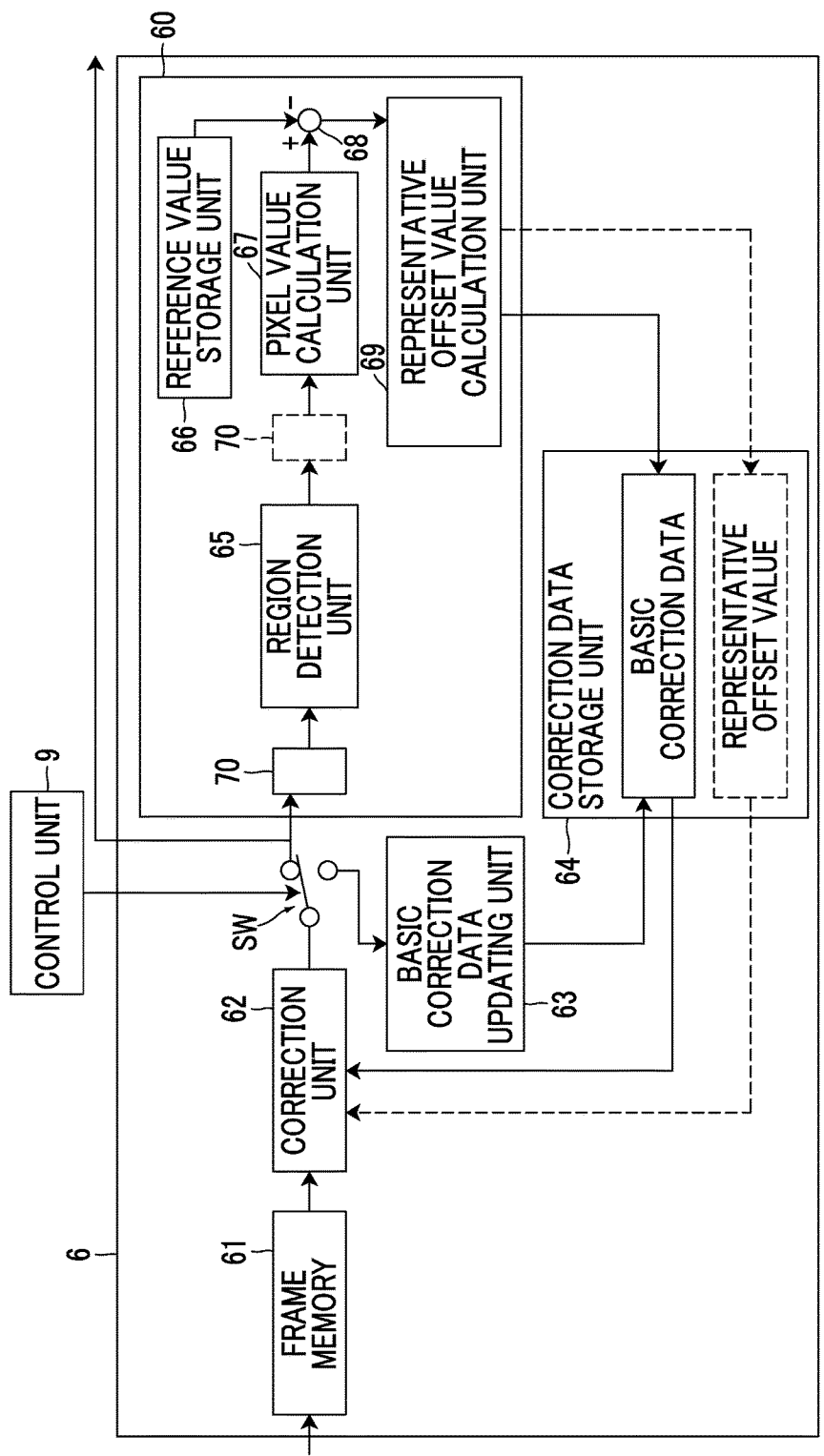
FIG. 9 is a block diagram showing a configuration of a digital signal processing unit according to a third embodiment.
Figure 10:
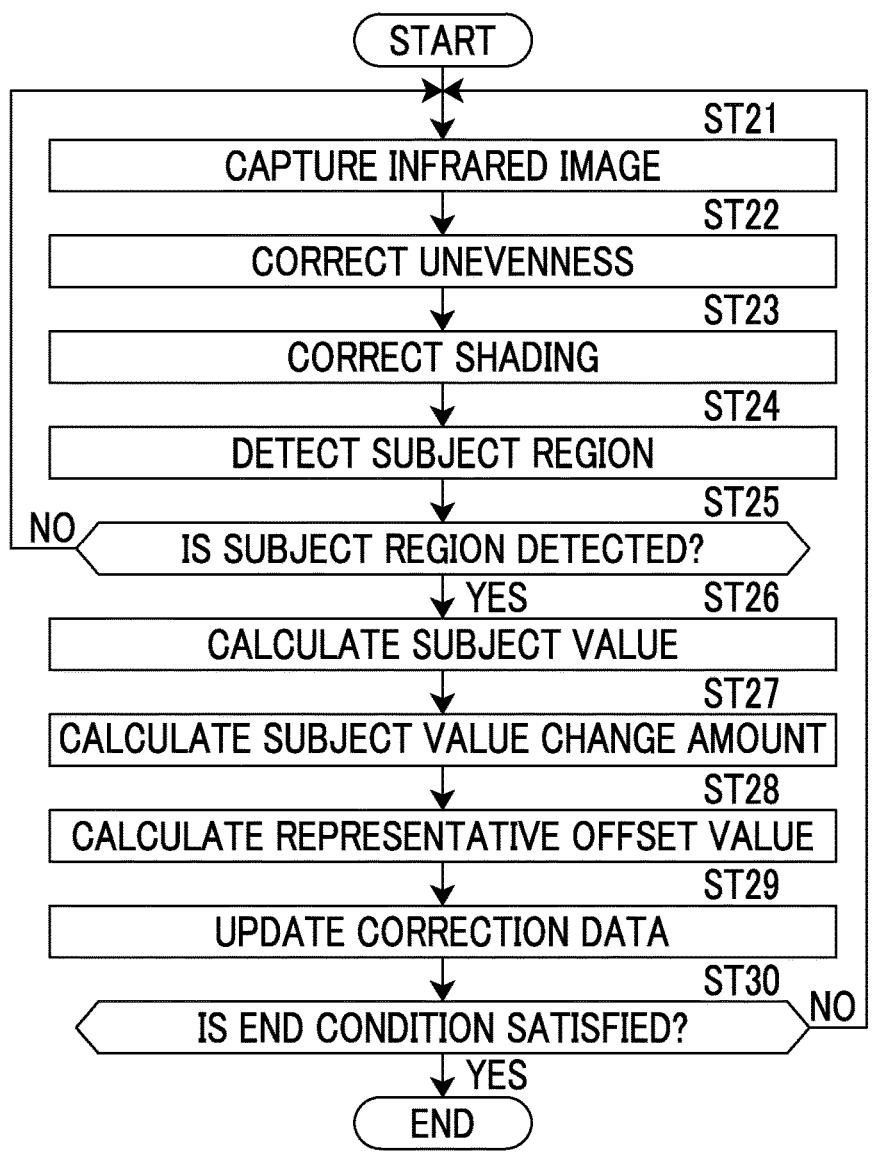
FIG. 10 is a flowchart showing signal correction processing according to the third embodiment.

As long as the above-described effect is an effect capable of correcting the difference in lens shading between the subject value and the reference subject value before the process of calculating the difference between the subject value and the reference subject value, as the subject value change amount is performed, the same effect is acquired even though a timing when the difference in lens shading is corrected is differentiated. Hereinafter, a third embodiment which is an example in which the subject value is calculated based on the pixel value in which the lens shading is corrected will be described. FIG. 9 is a diagram showing a configuration of a digital signal processing unit 6 according to the third embodiment, and FIG. 10 is a flowchart showing signal correction processing according to the third embodiment.

In the third embodiment, the offset value calculation unit 60 includes a shading correction unit 70 that performs the shading correction processing for correcting the shading caused by the optical system 1 on at least at part of the pixel values of the corrected image before the subject value change amount is calculated by the change amount calculation unit 68. In the third embodiment, it is preferable that the shading correction is performed on the corrected image acquired by performing the unevenness correction processing on the reference infrared image by the shading correction unit 70 to be described below, the subject region R is detected from the image in which the shading has been corrected, the subject value is calculated from the detected subject region R, and the calculated subject value is stored as the reference subject value in the reference value storage unit 66.

Here, the third embodiment is different from the first embodiment that the offset value calculation unit 60 includes the shading correction unit 70 that performs the shading correction processing on the pixel values corresponding to the plurality of pixels on the corrected image and the region detection unit 65 detects the subject region R based on the pixel values corresponding to the plurality of pixels on which the shading correction processing has been performed. Thus, the portions having the same configurations as those in the first embodiment will be assigned the same references, and thus, the description thereof will be omitted. Hereinafter, points different from those in the first embodiment will be described, and other common portions will not be described.

A flow of signal correction processing according to the third embodiment will be described with reference to FIG. 10. The processes of ST21 and ST22 in FIG. 10 are the same as the processes of ST01 and ST02 in FIG. 7, and thus, the description thereof will be omitted.

The shading correction unit 70 acquires a shading correction value of a pixel corresponding to each position of the corrected image for the corrected image output from the correction unit 62 while referring to the lens shading correction information which is a set of shading correction values corresponding to the lens shading of the pixels. The shading correction unit 70 performs shading correction by performing the offset operation on the shading correction value so as to correct (remove) the lens shading of the corresponding pixel from each pixel value of the corrected image (ST23). The shading correction information may be created through measurement at the time of manufacturing the device, and may be stored in the correction data storage unit 64 in advance.

Thereafter, the region detection unit 65 detects the subject region R based on the pixel values corresponding to the plurality of pixels on which the shading correction processing has been performed (ST24). Subsequently, the processes of ST26 to ST30 are the same as the processes of ST05 to ST09 of FIG. 7, and thus, the description thereof will be omitted.

In the third embodiment, since the subject value change amount is calculated by using the subject value in which the difference in lens shading is corrected, the same effect as that in the second embodiment is acquired. As in the third embodiment, in a case where the region detection unit 65 is configured to detect the subject region R from the corrected image in which the lens shading is corrected, it is possible to improve detection accuracy of the subject region R.

As a modification example of the third embodiment, the shading correction unit 70 may be configured to perform the shading correction processing on the pixel values of the pixels included in the detected subject region R as represented by a dashed-line unit of FIG. 9, the pixel value calculation unit 67 may be configured to calculate the subject value based on the pixel values included in the subject region R on which the shading correction processing has been performed. Hereinafter, points different from those in the third embodiment will be described, and other common portions will not be described.

In a modification example of the third embodiment, it is preferable that the subject region R is detected from the corrected image acquired by performing the unevenness correction processing on the reference infrared image, the shading correction unit 70 performs the shading correction processing on the detected subject region R, the subject value is calculated from the subject region R on which the shading correction has been performed, and the calculated subject value is stored as the reference subject value in the reference value storage unit 66.

Figure 11:
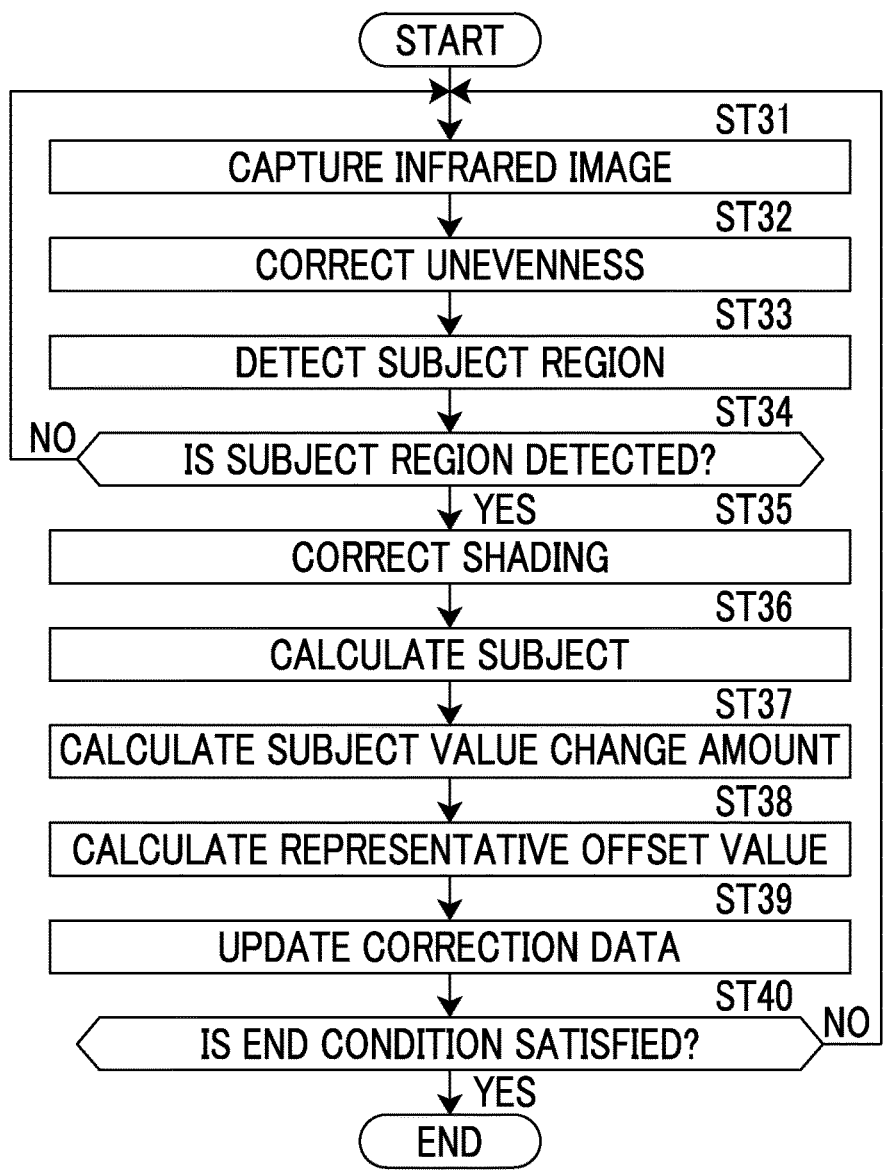
FIG. 11 is a flowchart showing signal correction processing according to a modification example of the third embodiment.

FIG. 11 is a flowchart showing the signal correction processing according to the modification example. The processes of ST31 to ST34 in FIG. 11 are the same as the processes of ST01 to ST04 in FIG. 7, and thus, the description thereof will be omitted.

In a case where the subject region R is detected, the shading correction unit 70 acquires the subject region R detected by the region detection unit 65, and acquires the shading correction value of the pixel corresponding to each position of the subject region R for the subject region R while referring to the lens shading correction information which is the set of shading correction values corresponding to the lens shading of the pixels. The shading correction unit 70 performs the shading correction by performing the offset operation on the shading correction value of the corresponding pixel so as to correct (remove) the lens shading of the corresponding pixel from each pixel value of the subject region R (ST35). The shading correction information may be created through measurement at the time of manufacturing the device, and may be stored in the correction data storage unit 64 in advance.

Thereafter, the pixel value calculation unit 67 calculates the subject value based on the pixel values included in the subject region R on which the shading correction processing has been performed (ST36). Subsequently, the processes of ST37 to ST40 are the same as the processes of ST06 to ST09 in FIG. 7, and thus, the description thereof will be omitted.

As stated above, in a case where the shading correction unit 70 performs the shading correction on the detected subject region R, it is possible to suppress an excess increase in calculation load by performing the shading correction on the pixel values in a range required in the calculation of the subject value. In the case described in the modification example, since the subject value change amount is able to be calculated by using the subject value in which the lens shading is corrected, the same effect as those in the second and third embodiments is acquired.

Hereinafter, a fourth embodiment will be described. In the first embodiment, the change amount (see the arrow portions on the right of FIG. 3) of the temperature dependent components B1 to B5 of the pixels P1 to P5 caused by the temperature change approximate the common value of the entire infrared detector 3, and the pixel values of the pixels are corrected by using the value of the subject region R as the representative offset value, as shown in FIG. 3. However, specifically, it is considered that the change amount (change amount of the temperature dependent components of the pixel values) of the pixel value of the pixel caused by the temperature change is a value intrinsic to the pixel.

Thus, in the fourth embodiment, the offset value calculation unit 60 calculates the intrinsic offset value indicating the change amount of each pixel value intrinsic to the pixels included in the infrared detector 3 by using the representative offset value indicating the change amount of each pixel value of the plurality of pixels included in the infrared detector 3. More specifically, the fourth embodiment is different from the first embodiment that the offset value calculation unit 60 further includes an intrinsic offset value calculation unit 71 and the correction unit 62 performs the offset correction on the infrared image by using the data acquired by increasing or decreasing the basic correction data by the intrinsic offset value. Hereinafter, points different from those in the first embodiment will be described, and other common portions will not be described.

The intrinsic offset value calculation unit 71 calculates the intrinsic offset value corresponding to the representative offset value for each pixel of the plurality of pixels the based on the intrinsic value information indicating the relationship between the representative offset value and the intrinsic offset value for each pixel for the plurality of pixels.

The intrinsic value information is measured and acquired in a manufacturing stage, and is stored in the correction data storage unit 64 in advance. The intrinsic value information may be constituted through any method for indicating the relationship between the representative offset value and the intrinsic offset value for each pixel. For example, the intrinsic value information may be acquired by providing a table in which the intrinsic offset value corresponding to the representative offset value is associated with each pixel to each of the plurality of representative offset values. For example, the intrinsic value information may be acquired by providing a table in which the difference between the representative offset value and the intrinsic offset value is associated with each pixel to each of the plurality of representative offset values.

Here, the intrinsic value information is a table in which a value (intrinsic value) of a ratio of the difference between the representative offset value and the intrinsic offset value for each pixel to the representative offset value is associated with each pixel. FIG. 13 shows an example of the intrinsic value information. The intrinsic value information of FIG. 13 represents intrinsic values corresponding to 5×5 pixels P1 to P25 in FIG. 5. The intrinsic value of the i-th pixel may be represented by the following Expression (3).

(intrinsic value of $i$-th pixel)={(intrinsic offset value of $i$-th pixel)−(representative offset value)}/(representative offset value)  (3)

The intrinsic offset value calculation unit 71 calculates a difference value (=(intrinsic offset value of i-th pixel)−(representative offset value)) between the representative offset value and the intrinsic offset value of the pixel for each pixel by multiplying the intrinsic value of each pixel by the representative offset value based on the intrinsic value information. The intrinsic offset value calculation unit 71 calculates the intrinsic offset value as the sum of the representative offset value and the difference value. The relationship between the intrinsic offset value, the representative offset value, and the intrinsic value may be expressed by the following Expression (4). Hereinafter, the difference value between the representative offset value and the intrinsic offset value of the i-th pixel is simply described as the difference value in some cases.

(intrinsic offset value of $i$-th pixel)=(representative offset value)+(difference value)=(representative offset value)+(representative offset value)×(intrinsic value of $i$-th pixel)  (4)

FIGS. 14A and 14B are basic correction data corresponding to the pixels P1 to P25 shown in FIG. 5. FIG. 14A shows the basic correction data before the updating processing is performed by the intrinsic offset value calculation unit 71, and FIG. 14B shows the basic correction data after the updating processing is performed by the intrinsic offset value calculation unit 71. An example in which the intrinsic offset value calculation unit 71 performs a process of calculating the intrinsic offset value by using the representative offset value and updating the basic correction data by using the intrinsic offset value will be described with reference to FIGS. 13, 14A, and 14B.

The intrinsic correction values for correcting the unevenness (variation component for each pixel) of each pixel are set as the basic correction data for each pixel, but a common correction value is set in FIG. 14A for the sake of convenience in description. All the values shown in FIGS. 13, 14A, and 14B are values for the sake of convenience in description, and are values different from the actual values. Although 5×5 pixels has been described for the sake of convenience in description, the offset value calculation unit 60 performs the updating processing of the basic correction data on all the pixels included in the infrared detector 3.

Here, it is assumed that the representative offset value calculation unit 69 calculates the subject value change amount (−10) as the representative offset value. The intrinsic offset value calculation unit 71 calculates the basic correction data shown in FIG. 14B by performing the offset operation expressed by Expression (5) on the correction value corresponding to each pixel Pi (1≤i≤25) of the basic correction data shown in FIG. 14A. As shown in FIG. 14B, it can be seen that the intrinsic offset value is added to each correction value of the basic correction data and the offset operation is performed on the correction value.

(updated correction value of $i$-th pixel)=(correction value of $i$-th pixel)+(intrinsic offset value of $i$-th pixel)  (5)

The intrinsic offset value calculation unit 71 updates the basic correction data stored in the correction data storage unit 64 by using the basic correction data on which the offset operation has been performed.

In a case where the representative offset value is calculated, the correction unit 62 performs the unevenness correction processing by subtracting the correction values of the pixels corresponding to the pixel values from the pixel values of the infrared image based on the basic correction data stored in the correction data storage unit 64. That is, the correction unit 62 performs the unevenness correction processing on the input infrared image by performing the offset operation expressed by Expression (6) on the i-th pixel (1≤i≤n) of the infrared image based on the updated correction data, and outputs the corrected image.

(output pixel value corresponding to $i$-th pixel)=(input pixel value of $i$-th pixel)−(updated correction value of $i$-th pixel)=(input pixel value of $i$-th pixel)−((correction value of $i$-th pixel)+ (intrinsic offset value of $i$-th pixel))  (6)

The intrinsic offset value calculation unit 71 may store the intrinsic offset value in any aspect as long as the intrinsic offset value is able to be specified in a case where the correction unit 62 performs the correction. For example, the intrinsic offset value calculation unit 71 may store the intrinsic offset data which is the set of intrinsic offset values in the correction data storage unit 64 different from the correction data storage unit that stores the basic correction data, as represented by a dashed line of FIG. 12. Although not shown, the intrinsic offset value calculation unit 71 may store the intrinsic offset data in the correction data storage unit 64 while classifying the intrinsic offset data into the representative offset value and difference data indicating the difference value of the representative offset value and the intrinsic offset value for each pixel.

The correction unit 62 performs the offset correction on the infrared image by using the data acquired by increasing or decreasing the basic correction data by the intrinsic offset value. Here, the infrared image as a correction target of the correction unit 62 may be an infrared image used at the time of calculating the representative offset value, or may be an infrared image captured later by the infrared image used at the time of calculating the representative offset value.

The "offset correction is performed on the infrared image by using the data acquired by increasing or decreasing the basic correction data by the intrinsic offset value" means that the operation for offsetting (removing) the intrinsic offset value and the correction value of the pixel corresponding to the pixel value included in the basic correction data from each pixel value of the infrared image is performed. Consequently, the "offset correction is performed on the infrared image by using the data acquired by increasing or decreasing the basic correction data by the intrinsic offset value" also includes any method of performing the operation for offsetting (removing) the intrinsic offset value and the correction value of the pixel corresponding to the pixel value included in the basic correction data from each pixel value of the infrared image.

For example, in a case where the infrared detector 3 has 1 to n pixels, the correction unit 62 may perform the offset correction through any method in a range in which the output pixel value of the i-th ($1 \leq i \leq n$) pixel output by the correction unit 62 satisfies (output pixel value corresponding to i-th pixel)=(input pixel value of i-th pixel)−(correction value of i-th pixel) μ (intrinsic offset value).

Figure 12:
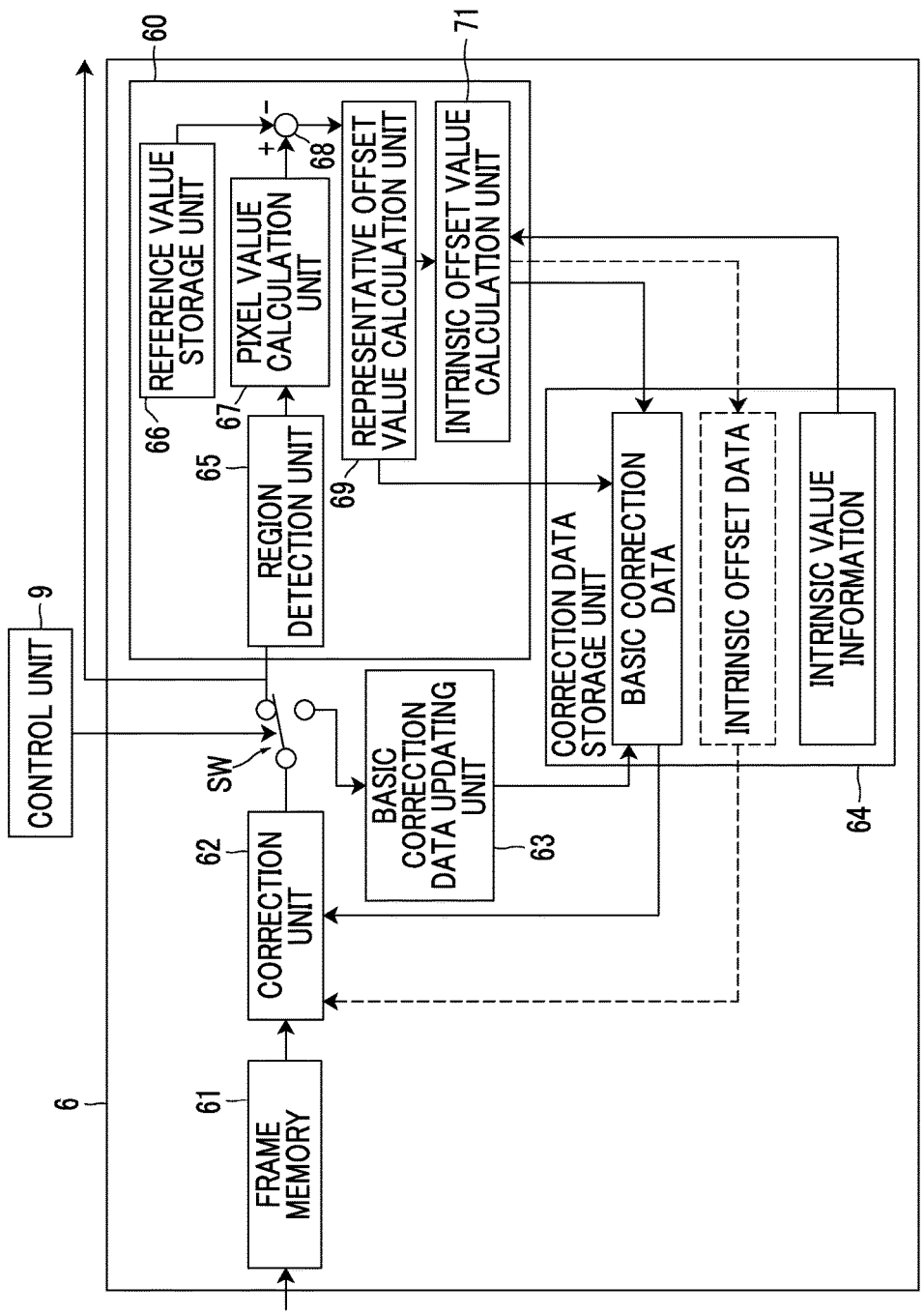
FIG. 12 is a block diagram showing a configuration of a digital signal processing unit according to a fourth embodiment.

For example, in a case where the intrinsic offset value and the basic correction data are individually stored in the correction data storage unit 64 as represented by a dashed line of FIG. 12, the correction unit 62 may perform the offset correction by subtracting the intrinsic offset value and the correction value of the pixel corresponding to the pixel value included in the basic correction data as expressed by Expression (6-1) from each pixel value of the infrared image while referring to the intrinsic offset value and the basic correction data.

(output pixel value corresponding to i-th pixel)=(input pixel value of i-th pixel)−(correction value of i-th pixel)−(intrinsic offset value of i-th pixel)     (6-1)

The intrinsic offset value may be stored while being classified into the representative offset value and the difference value in the correction data storage unit 64 by the intrinsic offset value calculation unit 71, and the basic correction data may be independently stored. In this case, as expressed by Expression (6-2), the correction unit 62 may perform the offset correction by subtracting the correction value of the pixel corresponding to the pixel value included in the basic correction data, the representative offset value, and the difference value between the representative offset value of the pixel and the intrinsic offset value from each pixel value of the infrared image. The order of the subtraction may be appropriately differentiated in a range in which the same result is acquired.

(output pixel value corresponding to i-th pixel)=(input pixel value of i-th pixel)−(correction value of i-th pixel)−(representative offset value)−(difference value of i-th pixel)     (6-2)

Consequently, as long as the correction unit 62 corrects (removes) at least the representative offset value and the corresponding correction values included in the basic correction data from the pixel values of the infrared image, the correction unit may perform the correction processing by using an additional correction value in addition to the representative offset value and the correction value included in the basic correction data.

Figure 15:
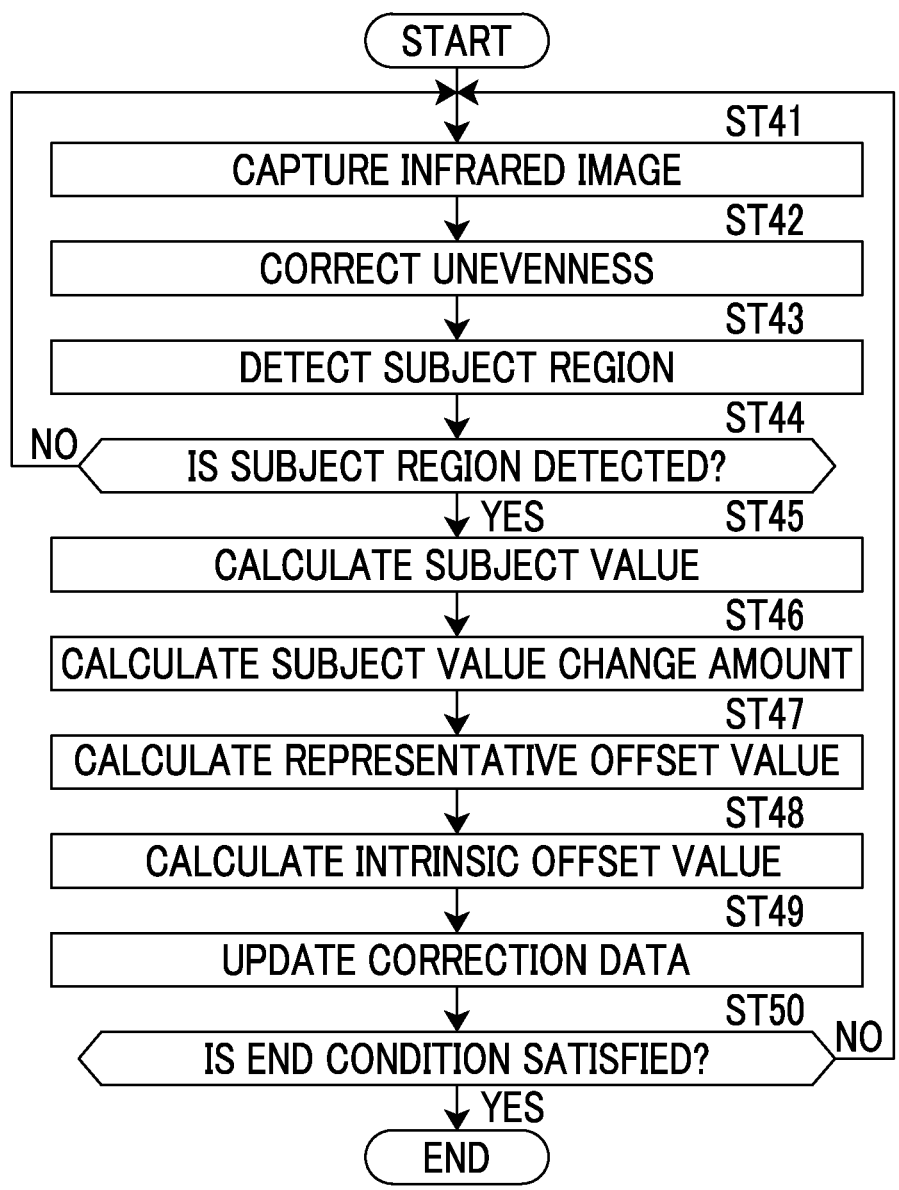
FIG. 15 is a flowchart showing the signal correction processing according to the fourth embodiment.

FIG. 15 is a flowchart showing a flow of signal correction processing according to the fourth embodiment. Hereinafter, the flow of the signal correction processing according to the fourth embodiment will be described with reference to FIG. 15. The processes of ST41 to ST47 in FIG. 15 are the same as the processes of ST01 to ST07 in FIG. 7, and thus, the description thereof will be omitted.

In a case where the representative offset value is calculated, the intrinsic offset value calculation unit 71 calculates the intrinsic offset value corresponding to the representative offset value for each pixel while referring to the intrinsic value information (ST48). The intrinsic offset value calculation unit 71 performs the offset operation on each correction value in the basic correction data by using the intrinsic offset value, and updates the basic correction data stored in the correction data storage unit 64 by the basic correction data acquired through the offset operation (ST49). In a case where the end condition is not satisfied (ST50, NO), the infrared imaging device 100 repeats the processes of ST41 to ST49. In a case where the end condition is satisfied (ST50, YES), the infrared imaging device 100 ends the process.

According to the fourth embodiment, since the correction unit 62 performs the unevenness correction processing by performing offset correction based on the data acquired by increasing or decreasing the basic correction data by the intrinsic offset value, it is possible to more appropriately correct the change in unevenness for each pixel caused by the temperature change.

The intrinsic value information is stored as a table in which a value (intrinsic value) of a ratio of the difference between the representative offset value and the intrinsic offset value for each pixel to the representative offset value is associated with each pixel, and the intrinsic offset value is calculated based on the intrinsic value information. Thus, it is possible to appropriately suppress an excess increase of the intrinsic value information stored in the correction data storage unit 64.

The fourth embodiment may be combination of the first to third embodiments and the modification examples thereof.

According to the embodiments of the present invention, the effects described above are appropriately acquired for noise generated based on, particularly, far-infrared rays (wavelength of 8 to 15 μm) of the infrared rays (wavelength of 0.7 μm to 1 mm). The infrared imaging device 100 according to the embodiments of the present invention may be appropriately applied to an imaging device for crime prevention or an imaging device to be mounted on the vehicle, may be constituted by a single imaging device that captures an infrared image, or may be assembled in an imaging system having a function of capturing an infrared image.

The above-described embodiments are merely examples, and all the descriptions are not used in order to exclusively interpret the technical range of the present invention. The aspects of the present invention are not limited to the above-described examples (first to fourth embodiments, other modification examples, and application examples). Any combinations of the elements of the individual examples are included in the present invention, and various modifications which can be conceived by those skilled in the art are included in the present invention. That is, various additions, modifications, and partial deletions may be made without departing from the conceptual idea and spirit of the present invention derived from the contents defined in the scope of claims and equivalents thereof.

EXPLANATION OF REFERENCES

1: optical system
2: shutter
3: infrared detector (infrared image sensor)
4: analog signal processing circuit
5: conversion circuit
6: digital signal processing unit
8: output unit
9: control unit
10: shutter driving mechanism
60: offset value calculation unit
61: frame memory
62: correction unit
63: basic correction data updating unit
64: correction data storage unit
65: region detection unit
66: reference value storage unit
67: pixel value calculation unit
68: change amount calculation unit
69: representative offset value calculation unit
70: shading correction unit
71: intrinsic offset value calculation unit
100: infrared imaging device

What is claimed is:

1. An infrared imaging device comprising:
an optical system;
an infrared detector that is positioned on an image forming surface of the optical system, includes a plurality of pixels which detect incident infrared rays, and captures a plurality of infrared images by using the plurality of pixels; and
a processor configured to:
generate a corrected image by correcting one of the plurality of infrared images captured by the infrared detector based on basic correction data for correcting unevenness for each pixel of the plurality of pixels,
detect a subject region corresponding to a target subject from the corrected image,
calculate a subject value indicating a pixel value of the subject region,
calculate a subject value change amount which is a change amount of the pixel value of the subject region based on the subject value and a reference subject value which is the pixel value of the subject region on a corrected reference image acquired by correcting a reference infrared image which is an infrared image as a reference image captured by the infrared detector based on the basic correction data, and calculate the subject value change amount, as a representative offset value indicating a change amount of each pixel value of the plurality of pixels caused by a temperature change, and
correct the infrared image captured by the infrared detector based on the representative offset value and the basic correction data.

2. The infrared imaging device according to claim 1, wherein, in a case where the processor corrects the infrared image captured by the infrared detector based on the representative offset value and the basic correction data, the processor performs offset correction on the infrared image by using data acquired by increasing or decreasing the basic correction data by the representative offset value.

3. The infrared imaging device according to claim 1, wherein the processor further configured to calculate an intrinsic offset value corresponding to the representative offset value for each pixel of the plurality of pixels based on intrinsic value information indicating a relationship between the representative offset value and the intrinsic offset value indicating the change amount of the pixel value of the pixel caused by the temperature change for each pixel of the plurality of pixels, and
wherein, in a case where the processor corrects the infrared image captured by the infrared detector based on the representative offset value and the basic correction data, the processor performs offset correction on the infrared image by using data acquired by increasing or decreasing the basic correction data by the intrinsic offset value.

4. The infrared imaging device according to claim 1, wherein, in a case where the processor calculates the subject value change amount, the processor performs correction for reducing a difference in shading caused by the optical system between the reference subject value and the subject value on at least one of the reference subject value or the subject value, and calculates a value acquired by subtracting the reference subject value on which the correction for reducing the difference in shading has been performed from the subject value on which the correction for reducing the difference in shading has been performed, as the subject value change amount.

5. The infrared imaging device according to claim 2, wherein, in a case where the processor calculates the subject value change amount, the processor performs correction for reducing a difference in shading caused by the optical system between the reference subject value and the subject value on at least one of the reference subject value or the subject value, and calculates a value acquired by subtracting the reference subject value on which the correction for reducing the difference in shading has been performed from the subject value on which the correction for reducing the difference in shading has been performed, as the subject value change amount.

6. The infrared imaging device according to claim 3, wherein, in a case where the processor calculates the subject value change amount, the processor performs correction for reducing a difference in shading caused by the optical system between the reference subject value and the subject value on at least one of the reference subject value or the subject value, and calculates a value acquired by subtracting the reference subject value on which the correction for reducing the difference in shading has been performed from the subject value on which the correction for reducing the difference in shading has been performed, as the subject value change amount.

7. The infrared imaging device according to claim 1, wherein the processor further configured to perform shading correction processing for correcting shading caused by the optical system on at least a part of pixel values of the corrected image before the subject value change amount is calculated.

8. The infrared imaging device according to claim 2, wherein the processor is further configured to perform shading correction processing for correcting shading caused by the optical system on at least a part of pixel values of the corrected image before the subject value change amount is calculated.

9. The infrared imaging device according to claim 3, wherein the processor is further configured to perform shading correction processing for correcting shading caused by the optical system on at least a part of pixel values of the corrected image before the subject value change amount is calculated.

10. The infrared imaging device according to claim 7, wherein the processor performs the shading correction processing on the pixel values corresponding to the plurality of pixels on the corrected image, and
detects the subject region based on the pixel values corresponding to the plurality of pixels on which the shading correction processing has been performed.

11. The infrared imaging device according to claim 7, wherein the processor performs the shading correction processing on the pixel values of the pixels included in the subject region, and
calculates the subject value based on the pixel values included in the subject region on which the shading correction processing has been performed.

12. The infrared imaging device according to claim 1, wherein, in a case where the processor calculates the subject value, the processor calculates any one of a mode, an average value, and a median based on a histogram indicating a distribution of the pixel values of the subject region, as the subject value.

13. The infrared imaging device according to claim 2, wherein, in a case where the processor calculates the subject value, the processor calculates any one of a mode, an average value, and a median based on a histogram indicating a distribution of the pixel values of the subject region, as the subject value.

14. The infrared imaging device according to claim 3, wherein, in a case where the processor calculates the subject value, the processor calculates any one of a mode, an average value, and a median based on a histogram indicating a distribution of the pixel values of the subject region, as the subject value.

15. The infrared imaging device according to claim 4, wherein, in a case where the processor calculates the subject value, the processor calculates any one of a mode, an average value, and a median based on a histogram indicating a distribution of the pixel values of the subject region, as the subject value.

16. The infrared imaging device according to claim 5, wherein, in a case where the processor calculates the subject value, the processor calculates any one of a mode, an average value, and a median based on a histogram indicating a distribution of the pixel values of the subject region, as the subject value.

17. The infrared imaging device according to claim 1, wherein, in a case where the processor detect the subject region, the processor detects a region corresponding to a person, as the subject region.

18. The infrared imaging device according to claim 1, wherein, in a case where the processor calculates the subject value change amount as the representative offset value, the processor repeatedly calculates the representative offset value on a regular basis.

19. The infrared imaging device according to claim 1, further comprising:
a shutter that is positioned between the infrared detector and the optical system, and is openable and closable; and
a controller that causes the infrared detector to capture a shutter image in a state in which the shutter is closed for a period during which the subject region is not present on the corrected image, and causes the processor to perform the basic correction data updating processing based on the shutter image,
wherein the processor further configured to perform basic correction data updating processing for correcting the basic correction data.

20. A signal correction method using an infrared imaging device including an infrared detector which is positioned on an image forming surface of an optical system and includes a plurality of pixels which detects incident infrared rays, the method comprising:
a capturing step of capturing a plurality of infrared images by using the plurality of pixels;
a generating step of generating a corrected infrared image by correcting an infrared image captured by the infrared detector based on basic correction data for correcting unevenness for each pixel of the plurality of pixels; and
an offset value calculation step,
wherein the offset value calculation step has
a region detection step of detecting a subject region corresponding to a target subject from the corrected infrared image,
a pixel value calculation step of calculating a subject value indicating a pixel value of the subject region,
a change amount calculation step of calculating a subject value change amount which is a change amount of the pixel value of the subject region based on the subject value and a reference subject value which is the pixel value of the subject region on a corrected reference image acquired by correcting a reference infrared image which is the infrared image which is a reference image captured by the infrared detector based on the basic correction data, and
a representative offset value calculation step of calculating the subject value change amount, as a representative offset value indicating a change amount of each pixel value of the plurality of pixels caused by a temperature change, and
the method further comprising
a correcting step of correcting the infrared image captured by the infrared detector based on the representative offset value and the basic correction data.

* * * * *